(12) United States Patent
Sarkar et al.

(10) Patent No.: US 6,936,367 B2
(45) Date of Patent: Aug. 30, 2005

(54) SOLID OXIDE FUEL CELL SYSTEM

(75) Inventors: Partho Sarkar, Edmonton (CA); Lorne Johanson, Edmonton (CA); Hongsang Rho, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 232 days.

(21) Appl. No.: 10/156,755

(22) Filed: May 23, 2002

(65) Prior Publication Data

US 2003/0134170 A1 Jul. 17, 2003

Related U.S. Application Data

(63) Continuation-in-part of application No. 10/053,241, filed on Jan. 16, 2002, now Pat. No. 6,846,588, and a continuation-in-part of application No. 10/078,548, filed on Feb. 14, 2002, now Pat. No. 6,824,907.

(51) Int. Cl.[7] .......................... H01M 8/12; H01M 8/24
(52) U.S. Cl. .................. 429/31; 429/32; 429/38
(58) Field of Search .................. 429/20, 31, 32, 429/38, 39

(56) References Cited

U.S. PATENT DOCUMENTS

| | | | |
|---|---|---|---|
| 4,454,207 A | 6/1984 | Fraioli et al. | 429/17 |
| 4,567,117 A | 1/1986 | Patel et al. | 429/19 |
| 4,729,931 A | 3/1988 | Grimble | 429/17 |
| 4,791,035 A | 12/1988 | Reichner | 429/31 |
| 5,169,730 A * | 12/1992 | Reichner et al. | 429/20 |
| 5,188,910 A * | 2/1993 | Ishihara et al. | 429/31 |
| 5,244,752 A | 9/1993 | Zymboly | 429/31 |
| 5,354,626 A | 10/1994 | Kobayashi et al. | |
| 5,380,600 A | 1/1995 | Hansen et al. | 429/17 |
| 5,411,767 A * | 5/1995 | Soma et al. | 429/31 X |
| 5,518,827 A | 5/1996 | Matsumura et al. | 429/19 |
| 5,733,675 A * | 3/1998 | Dederer et al. | 429/20 X |
| 5,763,114 A | 6/1998 | Khandkar et al. | 429/20 |
| 5,827,620 A | 10/1998 | Kendall | 429/31 |
| 5,976,721 A | 11/1999 | Limaye | 429/13 |
| 5,993,989 A | 11/1999 | Baozhen et al. | 429/41 |
| 6,017,646 A | 1/2000 | Prasad et al. | 429/13 |
| 6,423,436 B1 * | 7/2002 | George et al. | 429/31 |

FOREIGN PATENT DOCUMENTS

| | | | |
|---|---|---|---|
| EP | 0 055 011 A | 6/1982 | |
| JP | 02 192665 | 10/1990 | |
| JP | 04 355059 | 4/1993 | |
| JP | 08 050914 | 6/1996 | |
| WO | WO 99/17390 | 4/1999 | ............ H01M/8/12 |
| WO | WO 02/15310 A | 2/2002 | |
| WO | WO 03/069705 A | 8/2003 | |

* cited by examiner

*Primary Examiner*—Stephen J. Kalafut
(74) *Attorney, Agent, or Firm*—Knobbe, Martens, Olson & Bear LLP

(57) ABSTRACT

This invention relates to a fuel cell system comprising a fuel cell stack, external circuit electrical leads coupled to the fuel cell electrodes, and a thermal enclosure assembly enclosing the stack. The stack includes a plurality of inner tubular solid oxide fuel cells, the inside of the inner fuel cells being fluidly couplable to a first reactant source, and a porous support matrix embedding the inner fuel cells and being fluidly couplable to a second reactant source such that a second reactant is flowable through the matrix and to the outer surface of the embedded fuel cells. The stack may also include an outer tubular solid oxide fuel cell surrounding the matrix and the inner fuel cells such that the second reactant is flowable through the matrix and to an inside surface of the outer fuel cell and wherein the outer surface of the outer fuel cell is fluidly couplable to a first reactant source.

54 Claims, 23 Drawing Sheets

Fig 11
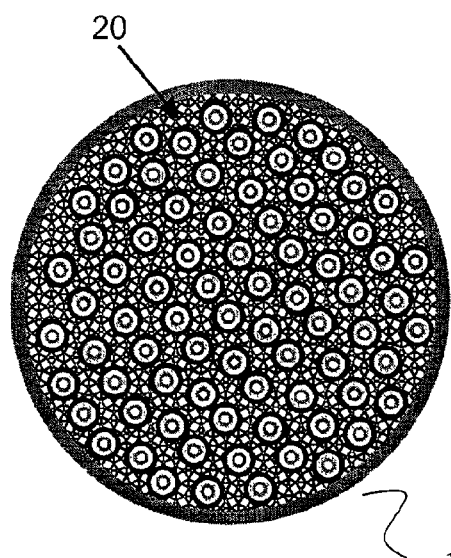
Fig 12
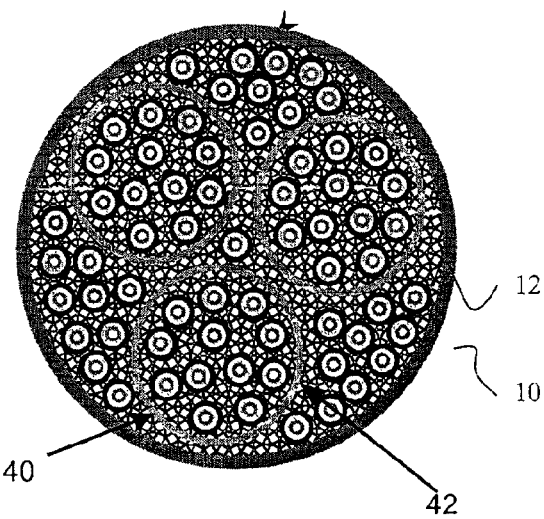
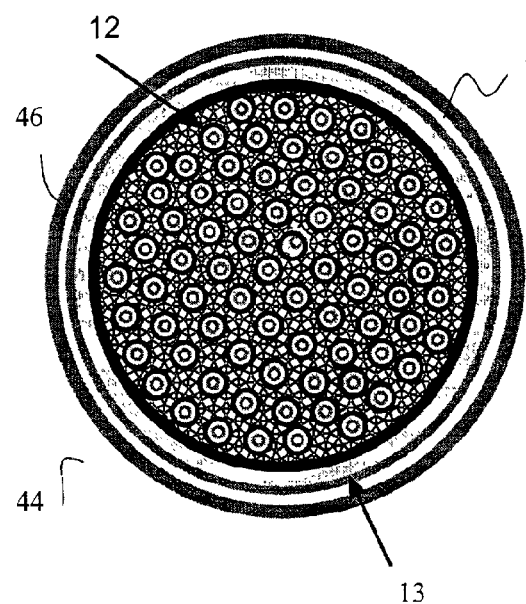
Fig. 13
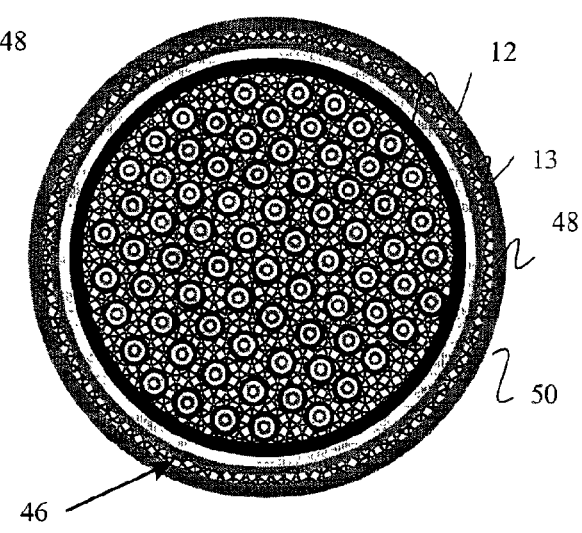
Fig. 14

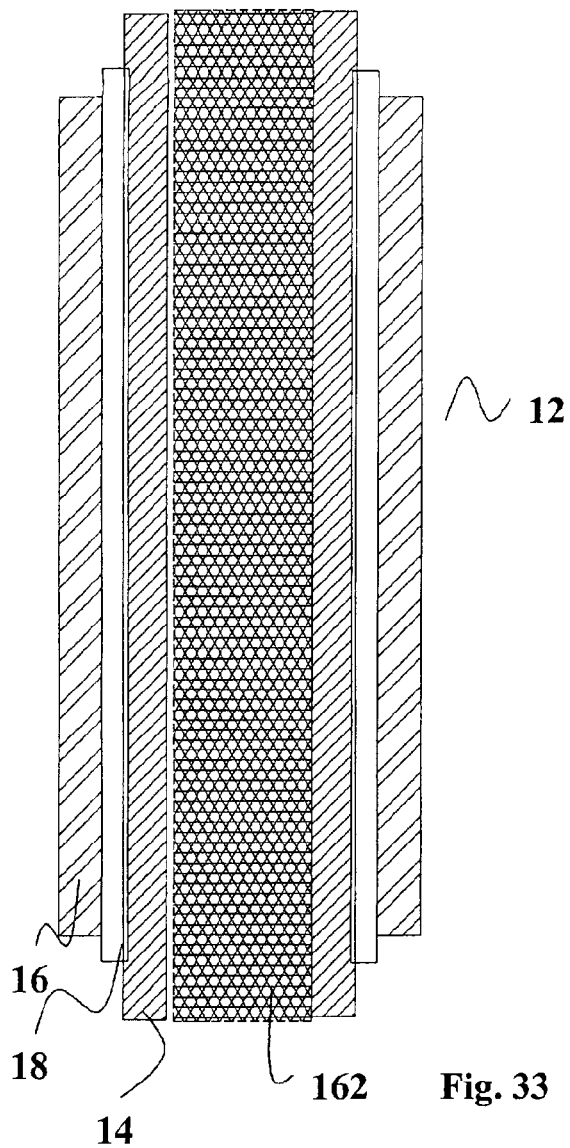
16
18
162  Fig. 33
14
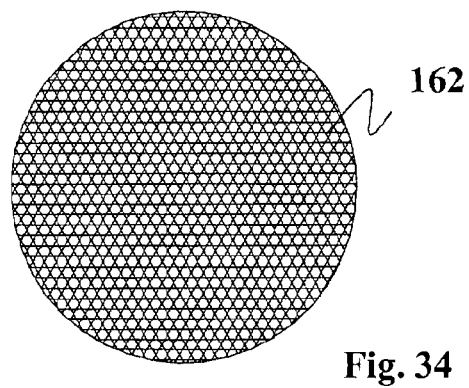
Fig. 34
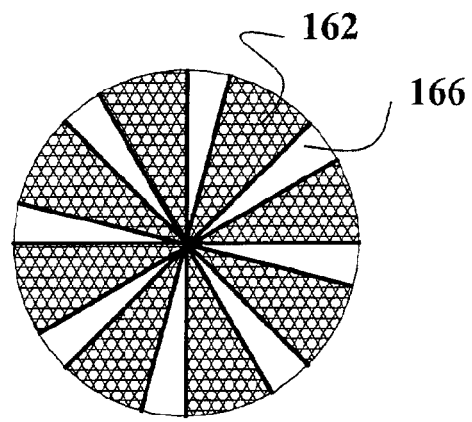
Fig. 35

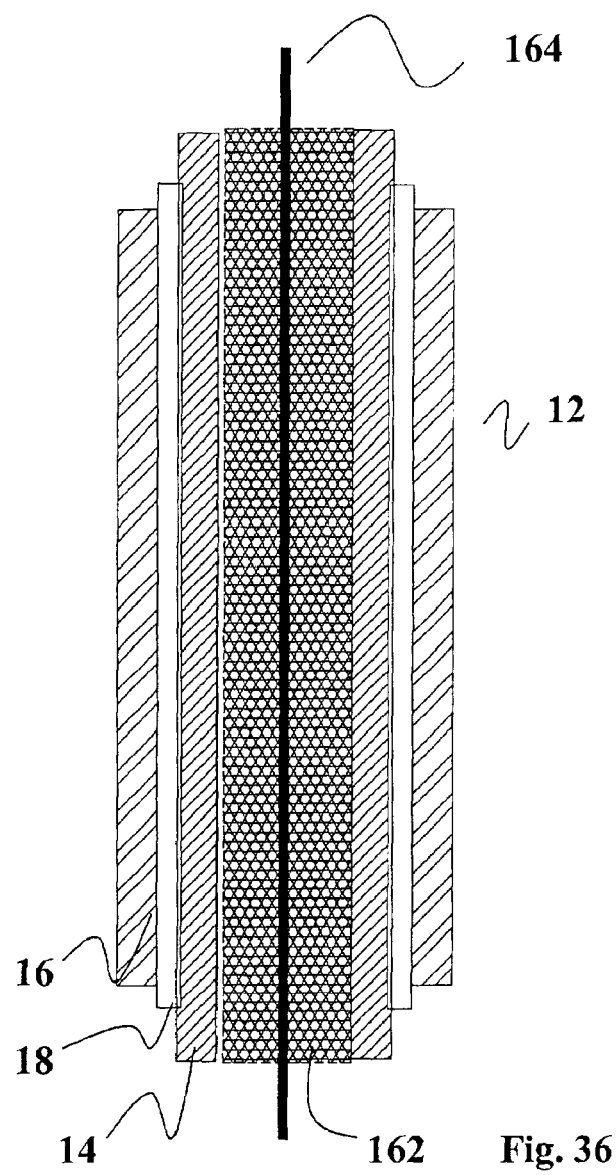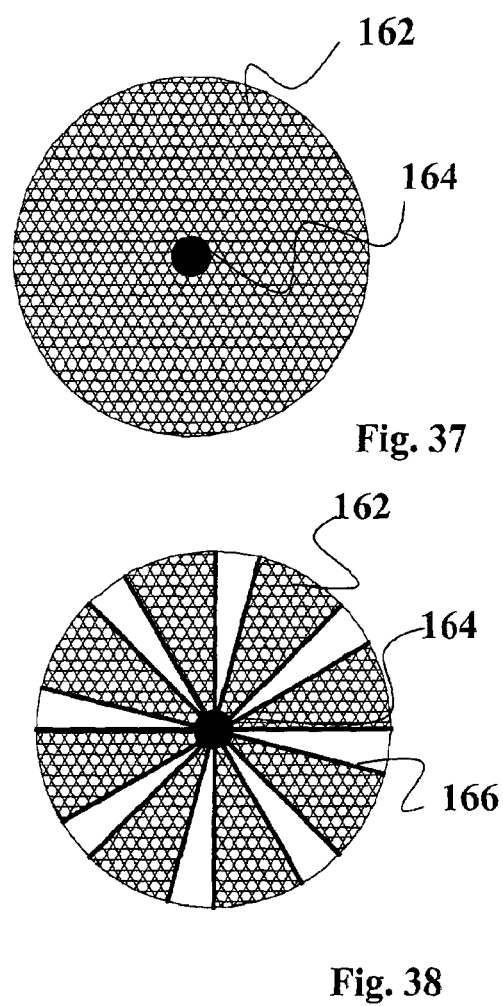
Fig. 37
Fig. 38
Fig. 36

US 6,936,367 B2

SOLID OXIDE FUEL CELL SYSTEM

RELATED APPLICATIONS

This application is a CIP and claims priority from and incorporates by reference U.S. application Ser. No. 10/053,241 filed Jan. 16, 2002, now U.S. Pat. No. 6,846,588 and 10/078,548 filed Feb. 14, 2002, now U.S. Pat. No. 6,824,907.

FIELD OF THE INVENTION

This invention relates to a fuel cell system having a stack of tubular solid oxide fuel cells.

BACKGROUND OF THE INVENTION

In general, a solid oxide fuel cell (SOFC) comprises a pair of electrodes (anode and cathode) separated by a ceramic, solid-phase electrolyte. To achieve adequate ionic conductivity in such a ceramic electrolyte, the SOFC operates at an elevated temperature, typically in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:

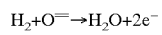

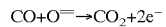

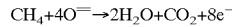

Cathode reaction:

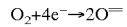

Known SOFC designs include planar and tubular fuel cells. Applicant's own PCT application no. PCT/CA01/00634 discloses a method of producing a tubular fuel cell by electrophoretic deposition (EPD). The fuel cell comprises multiple concentric layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube.

It is also known to arrange a plurality of tubular fuel cells in an array or "stack" to increase electrical output. Designs have been proposed for stacking together relatively large-diameter ($\geq 5$ mm) thick-walled tubular fuel cells that are essentially self-supporting; for example it is known to stack large diameter tubular fuel cells having diameters in the order of about 20 mm in a grid-like pattern and interconnect the fuel cells with nickel felt spacers. This and other known designs for large diameter self-supporting tubular fuel cells are not particularly well suited for small diameter fuel cells ($\leq 5$ mm), especially if such small diameter fuel cells are arranged into a tightly-packed array. It is therefore desirable to provide an improved stack design that enables the close-packing of a plurality of small-diameter tubular fuel cells, and a system for such stack.

SUMMARY OF THE INVENTION

According to one aspect of the invention, there is provided a fuel cell stack including:

(a) a plurality of inner tubular solid oxide fuel cells, the inside of at least one of the inner fuel cells being fluidly couplable to a first reactant source;

(b) a porous support matrix embedding the inner fuel cells and being fluidly couplable to a second reactant source such that a second reactant is flowable through the matrix and to the outer surface of at least one of the embedded fuel cells; and (c) an outer tubular solid oxide fuel cell wherein the inside of the outer fuel cell contains the matrix and the inner fuel cells such that the second reactant is flowable through the matrix and to an inside surface of the outer fuel cell and wherein the outer surface of the outer fuel cell is fluidly couplable to a first reactant source.

This fuel cell stack may be part of a fuel cell system that also comprises external circuit electrical leads electrically coupled to the anodes and cathodes of the fuel cells and electrically couplable to an external electrical circuit, and a thermal enclosure assembly enclosing the stack. The thermal enclosure includes a fuel inlet and a fuel outlet both fluidly coupled to anodes of the fuel cells, and an oxidant inlet and oxidant outlet both fluidly coupled to cathodes of the fuel cells.

The inner fuel cells of the fuel cell stack may each comprise an inner anode layer, an outer cathode layer, and an electrolyte layer sandwiched between the anode and cathode layers; the inner fuel cell layers may be concentrically arranged. The outer fuel cell may comprise an inner cathode layer, an outer anode layer, and an electrolyte layer sandwiched between the anode and cathode layers; the outer fuel cell layers may be concentrically arranged. As such, the first reactant is fuel and the second reactant source is oxidant.

The porous matrix of the fuel cell stack may be made of a an electronic or mixed (electronic and ionic) conductive porous solid state material and be electrically coupled to the cathodes of at least some of the inner fuel cells and the outer fuel cell, and be fluidly coupled to the oxidant inlet and outlet.

The fuel cell system may further comprise a container in between the thermal enclosure and the stack; the container may be spaced from the stack by spacing means such that a fuel flow channel is defined in between an inner surface of the container and the outer surface of the outer fuel cell. As such, the fuel flow channel is fluidly coupled to the fuel inlet and outlet. The spacing means may be a spacer tab, or a porous support matrix.

The stack may include oxidant delivery channels in the support matrix that are fluidly coupled to the oxidant inlet. Also, the stack may include an oxidant diffuser that has an inlet fluidly coupled to the oxidant inlet, and a plurality of outlets fluidly coupled to the support matrix.

At least some of the inner fuel cells may further comprise a porous matrix structure lining the anode surface of the fuel cell and be made of an porous, electrically conductive solid state material. At least some of the inner fuel cells may further comprise a plurality of electrically conductive tabs electrically coupled to the anode surface of the fuel cells, and electrically coupled to the electrical leads.

The stack may include an anode current collector rod embedded in the matrix, and electrically coupled to at least some of the tabs and to the electrical leads.

The stack may include at least one anode current collector plate having fuel cell openings for receiving the inner fuel cells, and reactant perforations in the plate that enable the flow through of oxidant to the cathodes of at least some of the inner fuel cells. The anode plate may be electrically coupled to at least some of the tabs and to at least some of the electrical leads. Also, the stack may include at least one cathode current collector plate having fuel cell openings for receiving the inner fuel cells, and reactant perforations in the plate that enable the flow through of oxidant to the cathode of at least some of the inner fuel cells. The cathode plate may be electrically coupled to at least some of the cathodes of the inner fuel cells and to at least some of the electrical leads.

The inner fuel cells may each have a diameter between 10 $\mu m$ to 3500 $\mu m$, or more particularly, a diameter between 200 $\mu m$ to 3000 $\mu m$.

According to another aspect of the invention, there is provided a fuel cell system including:
(a) a fuel cell stack comprising a plurality of tubular solid oxide fuel cells and a stack support structure attached to each of the fuel cells, the fuel cells each comprising an anode, a cathode, and an electrolyte sandwiched between the anode and cathode;
(b) a fuel reformer tube and including a reformer chamber having a reformer fuel inlet fluidly couplable to a fuel source and a reformer fuel outlet fluidly coupled with the anode of at least one fuel cell;
(c) external circuit electrical leads electrically coupled to the anode and cathode of at least one fuel cell and electrically couplable to an external electrical circuit; and
(d) a thermal enclosure assembly enclosing the stack and reformer tube and including a fuel inlet fluidly coupled to the reformer fuel inlet, a fuel outlet fluidly coupled to the anode of at least one fuel cell, and an oxidant inlet and outlet fluidly coupled to the cathode of at least one fuel cell.

The reformer chamber may be cup-shaped and as such the reformer contains the stack and further includes a porous catalyst coated foam-like matrix structure inside the reformer chamber. The reformer may further include a reformer tube inside the reformer chamber and be coiled around the stack, wherein the reformer fuel inlet is an inlet of the reformer tube, and the reformer fuel outlet is an outlet of the reformer tube. The reformer tube may include catalytic material dispersed along the inside of the reformer tube. Also, the reformer tube may be embedded in a heat-conductive and structurally-supportive matrix material.

The stack support structure may be a porous foam-like matrix embedding the fuel cells therein. Or, the stack support structure may be a metal mesh wrapped around each of the fuel cells. The matrix and mesh each have a porosity sufficient to allow the flow through of reactant to the outer electrode layer of at least one of the fuel cells. Or, the stack support structure may be a metal wire wrapped around each of the fuel cells; the wire is wrapped such that space is provided for reactant to flow past the wire to the outer electrode layer of at least one of the fuel cells.

According to another aspect of the invention, there is provided a fuel cell stack including:

(a) at least one tubular solid oxide fuel cell, the fuel cell including an electrode inner layer, an electrode outer layer, an electrolyte layer sandwiched between the electrode layers, and a tab opening in the surface of the electrode outer layer and through the underlying electrolyte layer;
(b) an electrically conductive tab for electrically coupling to an external circuit, the tab comprising an electrically conductive material coating the exposed portion of the inner layer; and
(c) a stack support structure attached to each of the fuel cells.

The electrode inner layer may be the anode, and the electrode outer layer may be the cathode. The tab coating material coating the electrode inner layer may be an inert metal that is suitable for use under SOFC operating conditions. The stack support structure may be a porous support matrix embedding the fuel cells therein, the porous matrix being made of an electronic or mixed (electronic and ionic) conductive, porous solid state material and being electrically coupled to the cathode of at least some of the fuel cells and being electrically coupled to the electrical leads.

This fuel cell stack may be incorporated into a fuel cell system. The fuel cell system may also include external circuit electrical leads electrically coupled to the anode and cathode of the fuel cells and electrically couplable to an external electrical circuit; and a thermal enclosure assembly enclosing the stack and including a fuel inlet and outlet fluidly communicative with anodes of the fuel cells, and an oxidant inlet and outlet fluidly communicative with cathodes of the fuel cells.

According to another aspect of the invention, there is provided a fuel cell stack including at least one tubular solid oxide fuel cell, and a stack support structure attached to each of the fuel cells. The tubular solid oxide fuel cell includes an inner electrode layer, an outer electrode layer, an electrolyte sandwiched between the electrode layers, and, a porous, electrically conductive inner core having a porosity sufficient to allow the flow through of reactant to the inner electrode layer, the inner core being inside the fuel cell and electrically coupled to the inner electrode layer.

The inner core may include a foam-like electrically conductive matrix structure electrically and mechanically coupled to the inner electrode layer. The matrix structure may be coated with a catalyst material. The fuel cell further may further include a current collector rod embedded in the inner core matrix structure longitudinally to the inside of the fuel cell and having at least one end that is electrically couplable to an external circuit. The inner core may further include at least one reactant flow channel in the matrix structure.

The inner core instead may include a plurality of electrically conductive sheets mechanically and electrically coupled to the inner electrode layer. Or, the inner core may include a current collector rod extending longitudinally through the inside of the fuel cell and a plurality of electrically conductive filaments extending generally transversely from the collector rod and electrically and mechanically coupled to the inner electrode layer.

DETAILED DESCRIPTION OF DRAWINGS

FIGS. 11 and 12 are schematic end views of fuel cell stacks comprising a plurality of tubular fuel cells embedded in the matrix (FIG. 11) and a plurality of fuel cells and sub-stacks of fuel cells embedded in the support matrix (FIG. 12).

FIGS. 13 and 14 are schematic end views of two fuel cell stack designs that each comprise a plurality of inner tubular fuel cells embedded in a foam-like porous support matrix and located inside an outer fuel cell.

FIG. 33 is a schematic sectional longitudinal view of a fuel cell having a porous foam-like inner core.

FIG. 34 is a schematic cross-sectional view of the inner core of FIG. 33, and FIG. 35 shows the inner core of FIG. 34 having interspersed reactant flow channels.

FIG. 36 is a schematic side view of the fuel cell in FIG. 33 having additionally an electrically conductive wire embedded in the inner core.

FIG. 37 is a schematic cross-sectional view of the inner core of FIG. 36, and FIG. 38 shows the inner core of FIG. 37 having interspersed reactant flow channels.

DETAILED DESCRIPTION

Definitions

When describing the present invention, the following terms have the following meanings, unless indicated otherwise. All terms not defined herein have their common art-recognized meanings.

The term "fibre" or "filament" refers to a single strand of fibrous material; "fibre tow" or "fibre bundle" shall refer to a multi-filament yarn or an array of fibres; and "fibre core" shall refer to a fibre, filament, fibre tow or fibre bundle. In all cases, the fibre core is electrically conductive or treated to be electrically conductive to allow its use as an electrode.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), silicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yittria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

The term "porous" in the context of hollow ceramic, metal, and cermet membranes and matrices means that the material contains pores (voids). Therefore, the density of the porous material is lower than that of the theoretical density of the material. The voids in the porous membranes and matrices can be connected (i.e., channel type) or disconnected (i.e. isolated). In a porous hollow membrane or matrix, the majority of the pores are connected. To be considered porous as used herein in reference to membranes, a membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

Figure 1:
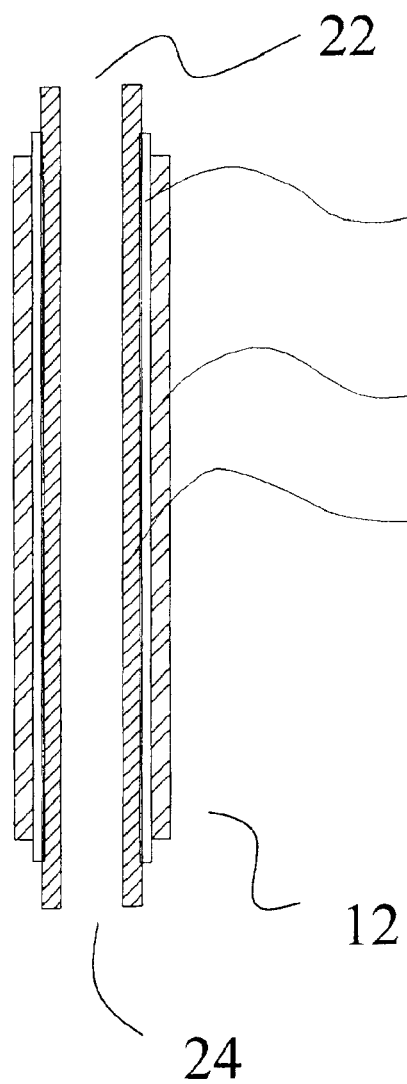
FIG. 1 is a schematic longitudinal section view of a tubular solid oxide fuel cell (SOFC).

Referring to FIG. 1, a small-diameter tubular solid oxide fuel cell 12 comprises three concentric hollow inorganic membranes (HIM) that are in continuous contact with each other to form a multi-membrane structure. The inner membrane layer is an anode 14, the outer membrane layer is a cathode 16, and the middle membrane layer is an electrolyte 18.

To serve as electrodes, the inner and outer membranes, 14, 16 are made of a material that is porous, catalytic, and electrically and ionically conductive. This enables the electrodes 14, 16 to collect electrical current, to allow reactant to flow to the electrolyte 18, to encourage electrochemical reactions, and to conduct ions that permeate through the electrolyte 18. In this embodiment, the anode 14 is made of a nickel and zirconia cermet. The anode 14 may optionally have a thin layer of nickel on the inner surface of the cermet layer, such that a two-layered anode structure is provided. The cathode 16 is made of LSM. The electrolyte 18 is made of a zirconia ceramic material. The anode 14 preferably has a thickness of between 1 $\mu$m to 400 $\mu$m. The cathode 16 preferably has a thickness of between 1 $\mu$m to 200 $\mu$m. The electrolyte 18 preferably has a thickness of between 0.5 $\mu$m to 25 $\mu$m. The total diameter of the fuel cell 12 is preferably between 10 $\mu$m to 3000 $\mu$m but may be as large as 10,000 $\mu$m. The fuel cell length is $\geq$50× the diameter.

To provide a tubular fuel cell 12 with these characteristics, and in particular, with the desired dimensions, the inner anode layer 14 may be formed by depositing cermet material on a combustible electrically conductive core (not shown, and commonly referred to as a "deposition electrode") by electrophoretic deposition (EPD). The electrolyte layer 18 may be formed by depositing YSZ material onto the inner electrode layer 14 by EPD. One suitable process for producing an inner electrode and electrolyte by EPD is described in Applicant's PCT application no. PCT/CA01/00634. The outer electrode layer 16 may be formed by applying a LSM layer onto the electrolyte 18 by one of dip-coating or painting as known in the art, or by EPD. One or more sintering steps are carried out to combust the conductive core.

In certain commercial applications, it is desirable to provide a fuel cell system having a relatively high power density, i.e. a fuel cell system that provides a high power-to-volume ratio. Such high power densities may be achieved by assembling the fuel cells 12 in close proximity to each other to produce a fuel cell stack 10. Also, higher power densities can be achieved by increasing the active surface area per unit volume of the system; for example, the active surface area per unit volume can be increased by decreasing the diameter of each tubular fuel cell 12, thereby increasing the number of fuel cells 12 that can be stacked in a given volume. Therefore, it is preferred to employ small-diameter tubular fuel cells 12. Such small-diameter fuel cells 12 especially if made of ceramic or some of its composites tend to be somewhat fragile, and are relatively vulnerable to damage when assembled into a tightly packed array; that is, ceramic structures being brittle tend to fail catastrophically. Thin-walled elongate ceramic structures tend to be particularly fragile, and may fail when subjected to bending forces or vibrations that exceed the fracture stress of the ceramic. Therefore, the fuel cells 12 are embedded in a foam-like porous material 20 ("support matrix") that inter alia, serves as a support structure for the fuel cells (see FIG. 6).

The support matrix 20 is made from ceramic or another material that is able to withstand typical SOFC operating temperatures, e.g. steel or a superalloy. The support matrix 20 may be made of LSM to enable it to operate at up to around 1000° C. and to serve to collect current, to ionize oxygen into oxide ions, and to conduct these ions to the electrolyte. The support matrix 20 fills the spaces between the fuel cells 12 and contacts the outer surface of each fuel cell 12, i.e. the cathode layer 16 of each fuel cell 12. Because the support matrix 20 is of the same material as the cathode layer 16, the support matrix 20 serves to increase the effective surface area of the cathode 16, thereby increasing the area for collecting electrons, and ionizing oxygen.

Instead of LSM, the support matrix 20 may alternatively be made of any suitable electronic or mixed (electronic and ionic) conductive porous solid state material. When made from an electronic conductive material (e.g. metal), the support matrix 20 can carry electricity by electron transportation. When made from a mixed conductor material (e.g. LSM or metal/ceramic composite), the support matrix 20 can carry electricity by electron and ion transportation. When made from an ionic conductor material (e.g. Yittria-doped zirconia), the support matrix 20 can carry electricity by ion transportation.

When the support matrix 20 is made entirely of steel or a superalloy, it serves to provide mechanical support to hold the single cells together, as well as to serve as a current collector. If the support matrix 20 is made of a steel or a superalloy coated with a catalyst, it serves to provide mechanical support, collect current, and promote chemical reactions, such as ionization. If the support matrix 20 is made of a steel or a superalloy coated with catalyst and an ionic or mixed conductor, it serves to provide mechanical support, collect current, promote chemical reactions, and provide an ionic conduction path.

The support matrix 20 is porous (with channel-type connected pores) to allow the flow through of oxidant through the stack 10, and to the cathode layer 16 of each fuel cell 12. The porosity of the support matrix 20 is selected to provide a sufficient oxidant flow-through rate and sufficient mechanical strength to serve as a support structure for the fuel cell stack 10. In this connection, the support matrix 20 has a porosity of between 40–95% and preferably about 70%.

Figure 2:
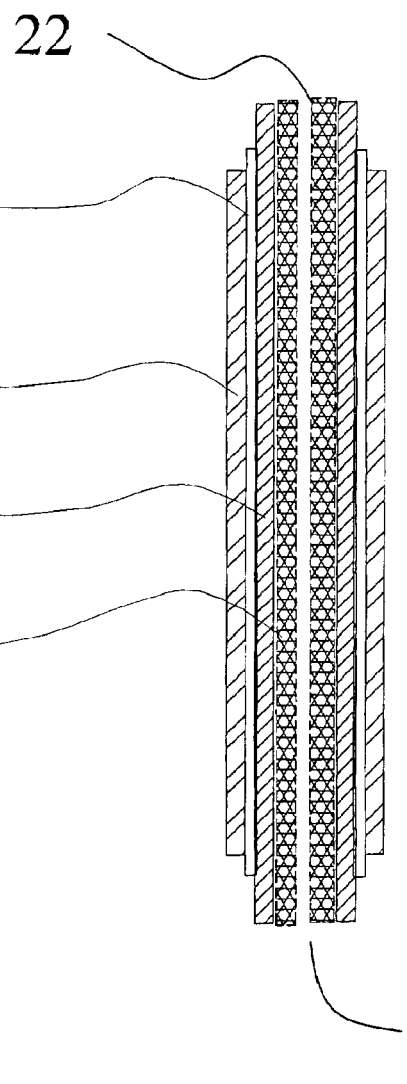
FIG. 2 is a schematic longitudinal section view of a tubular SOFC having a porous matrix structure lining the inside of the fuel cell.

Optionally, and referring to FIG. 2, the fuel cell 12 may be lined on its inner surface with a porous electrically conductive anode matrix 21. The anode matrix 21 serves to enhance anode catalytic activity and current collection. The anode matrix 21 may be made from the following materials:

(a) Porous metal, e.g. silver, nickel, copper, stainless steel, superalloy. Main function: collect current.
(b) Porous metal covered with catalyst. Main functions: collect current, promote chemical reaction.
(c) Porous metal coated with catalyst and ionic or mixed conductor. Main functions: collect current, promote chemical reaction, provide ionic conduction path.
(d) Anode materials, e.g. nickel/zirconia cermet, wherein the cermet has a higher porosity than an anode layer, the porosity being sufficient to provide a fuel gas flow path. Main functions: collect current, promote chemical reactions, provide ionic conductive path.

Figure 3:
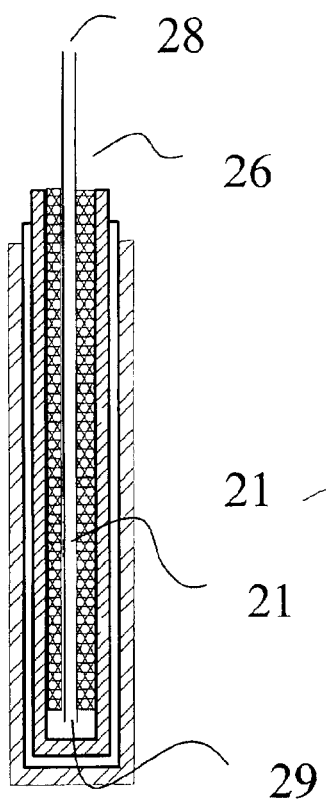
FIG. 3 is a schematic longitudinal section view of a tubular SOFC closed at one end.

The fuel cell 12 in this embodiment is an elongate cylindrical tube, but it is to be understood that it is within the scope of the invention for the fuel cell 12 to have other cross sectional or longitudinal shapes; for example, the fuel cell 12 may have a "U" shape or a coil shape. For elongate circular cross-sectional tubes, the fuel cell 12 may be open at both ends, as shown in FIGS. 1 and 2, or may be closed at one end, as shown in FIG. 3. If open at both ends, fuel is fed through an inlet end 22 of the fuel cell 12 and is electrochemically reacted as it travels along the length of the tube. Unreacted fuel and reaction products are discharged at an opposite outlet end 24 of the fuel cell 12. For fuel cells open only at one end, a feed tube 26 made out of a metal such as nickel, stainless steel, or a superalloy that can withstand SOFC operating conditions is embedded in the anode matrix 21, and has an inlet 28 for receiving fuel and an outlet 29 near the bottom of the closed end of the fuel cell 12. The tube 26 serves to deliver gas as well as collect current. Fuel is fed into the feed tube inlet 28 and travels downwards to the bottom of the feed tube 26, wherein it is discharged at the outlet 29 for upward travel towards the top of the tube; as the fuel travels upwards, it is electrochemically reacted at the anode 14. Unreacted fuel and reaction products are discharged at the top of fuel cell 12, i.e. at the open end of the fuel cell 12. Alternatively, the feed tube 26 may be made of ceramic material (e.g. alumina) and that outside of the tube is coated with an electronically conductive material, the material being selected to withstand SOFC operating conditions. Such a feed tube 26 serves to deliver gas well as collect current.

It is to be understood in this specification that directional terms such as bottom, top, upwards, downwards etc. are used only for convenient reference and are not to be construed as limitations to the operational orientation of a fuel cell 12 or stack 10.

Figure 4:
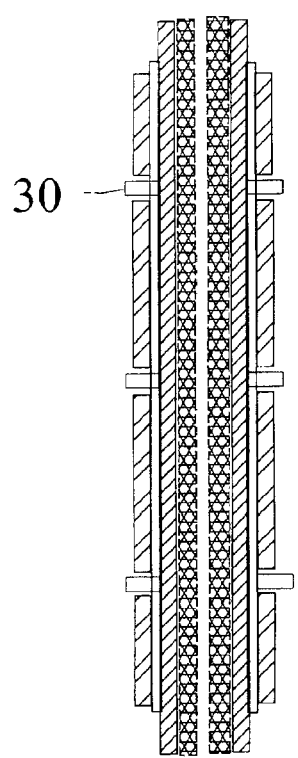
FIG. 4 is a schematic longitudinal side view of a tubular SOFC open at both ends and having a plurality of electrically conductive anode tabs.
Figure 5:
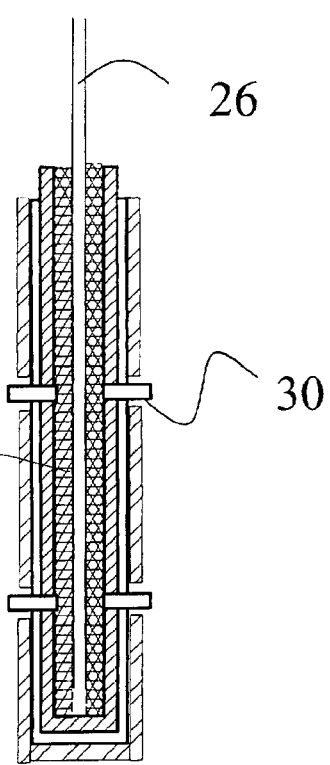
FIG. 5 is a schematic longitudinal side view of the tubular SOFC of FIG. 3 having a plurality of electrically conductive anode tabs.

One or both ends of the anode layer can be electrically connected to an external circuit for transmitting current. However, to reduce the $I^2R$ losses during current collection, a series of current collector tabs 30 are interspersed along the length of the fuel cell 12. Referring to FIGS. 4 and 5, these tabs 30 are spaced along the length of fuel cell 12 to reduce the electrical path length, thereby reducing losses. The tabs 30 are a silver or other inert metal coating on an exposed anode layer portion that is suitable for use under SOFC operating conditions. The tabs 30 are produced as follows: after the electrolyte layer 18 has been deposited on the anode layer 14, but prior to applying the outer cathode layer 16 to the electrolyte 18, and prior to sintering the electrolyte 18, a section of the electrolyte layer 18 is removed to expose a portion or the inner anode layer 14. The electrolyte layer portion can be removed when dry by using abrasive paper, cotton, etc. or be removed before completely dry by gently rubbing with wet or dry cotton, paper, etc. After sintering the anode and electrolyte layers 14, 18, the exposed anode portion is coated with silver paint (or any other electrically conductive material). The coating is applied such that the tab portion is made gas impermeable. Then, a drying and sintering step is applied to bond the silver to the exposed anode surface. Then, the outer cathode layer 16 is applied to the electrolyte 18, and the tab-bearing fuel cell 12 is sintered at between 900 and 1300° C.

Figure 6:
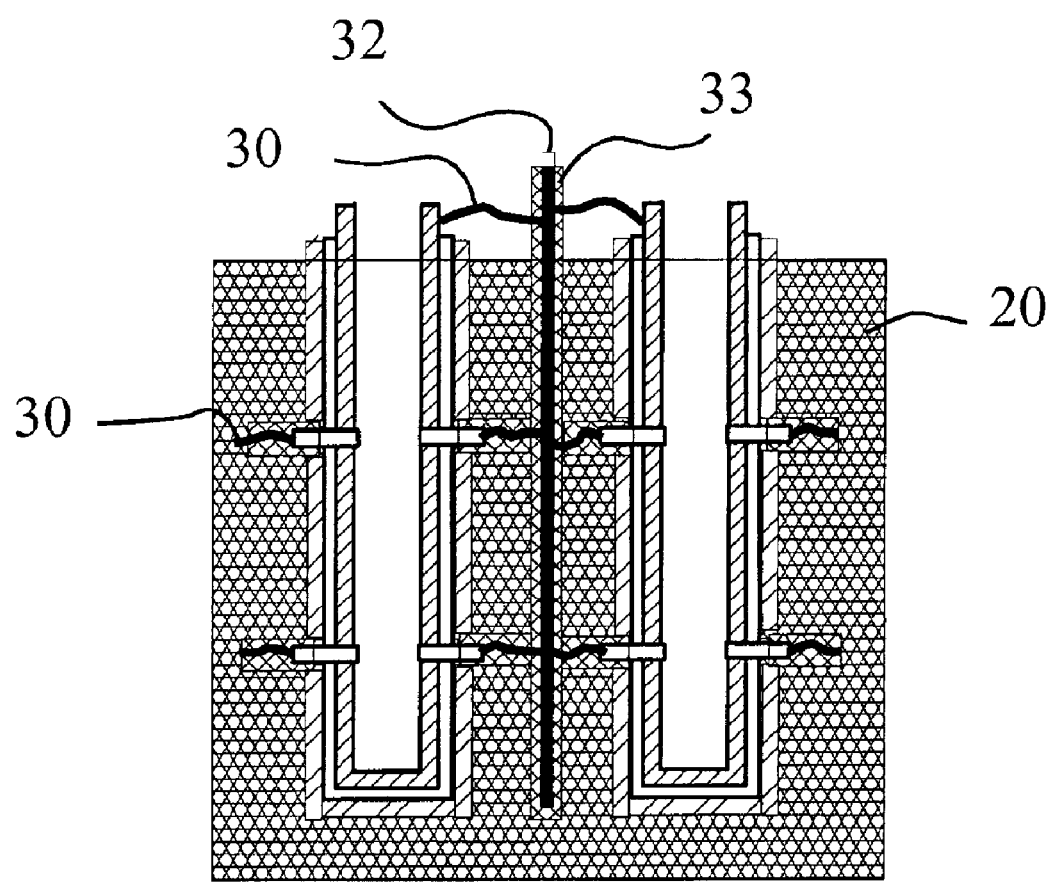
FIG. 6 is a schematic sectional side view of a pair of tubular SOFC and an anode current collector rod embedded in a porous support matrix.

The fuel cell 12 may be embedded with other fuel cells 12 in the matrix 20 to form the fuel cell stack 10. In one optional embodiment as shown in FIG. 6, also embedded in the matrix 20 is an anode current collector rod 32. The collector rod 32 is made from a suitable material that is electrically conductive and able to withstand SOFC operating conditions; suitable materials include stainless steel, superalloy, and silver. The collector rod 32 is electrically coupled to the anode tabs 30. The collector rod 32 is connectable to an external circuit (not shown) to conduct the current collected from the tabs 30 to the external circuit. The tabs 30 and rod 32 are wrapped in an electrical insulator to electrically separate the tabs 30 and rod 32 from the cathode 16 and the portion of the support matrix 20 electrically contacting the cathode 16.

Figure 7:
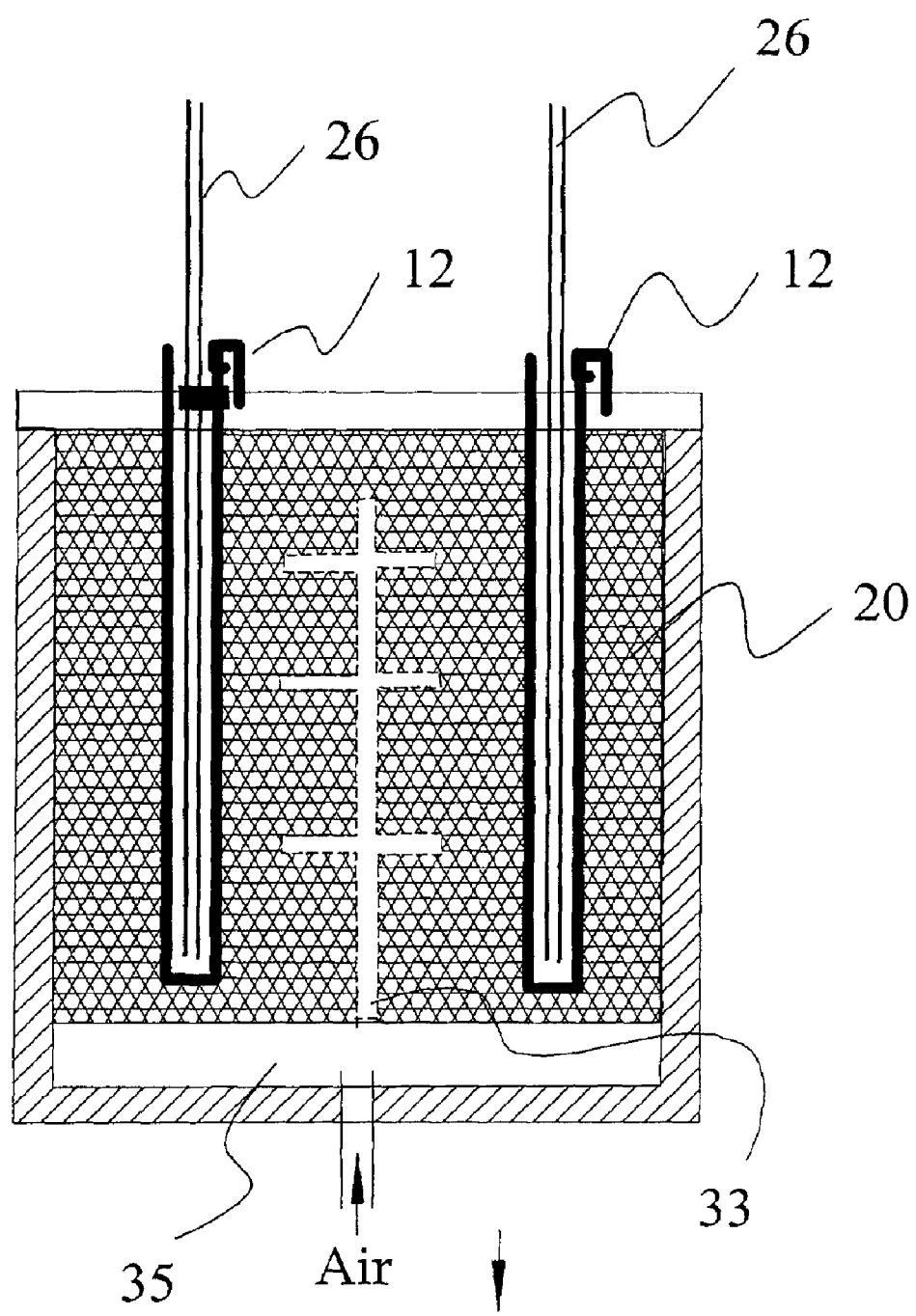
FIG. 7 is a schematic sectional side view of a fuel cell system having a pair of tubular SOFC embedded in a porous support matrix that has branched oxidant delivery channels.

Referring to FIG. 7, the support matrix 20 may optionally have a number of attached tubular voids ("oxidant distribution channels") 33 that serve to enhance the transmission of oxidant/air to the cathode 16 of each fuel cell 12. Such distribution channels 33 may be formed by inserting combustible cores in the matrix material during formation of the support matrix 20, then combusting away the cores to leave voids in the support matrix 20. The method of forming the support matrix 20 is described in further detail below. Oxidant or air may be supplied to the distribution channels 33 via a diffuser 35; such diffuser 35 may extend transversely at one end of the stack in the support matrix 20 and have perforations to discharge oxidant or air into the support matrix 20 in addition to discharging oxidant or air into the distribution channels 33.

Figure 8:
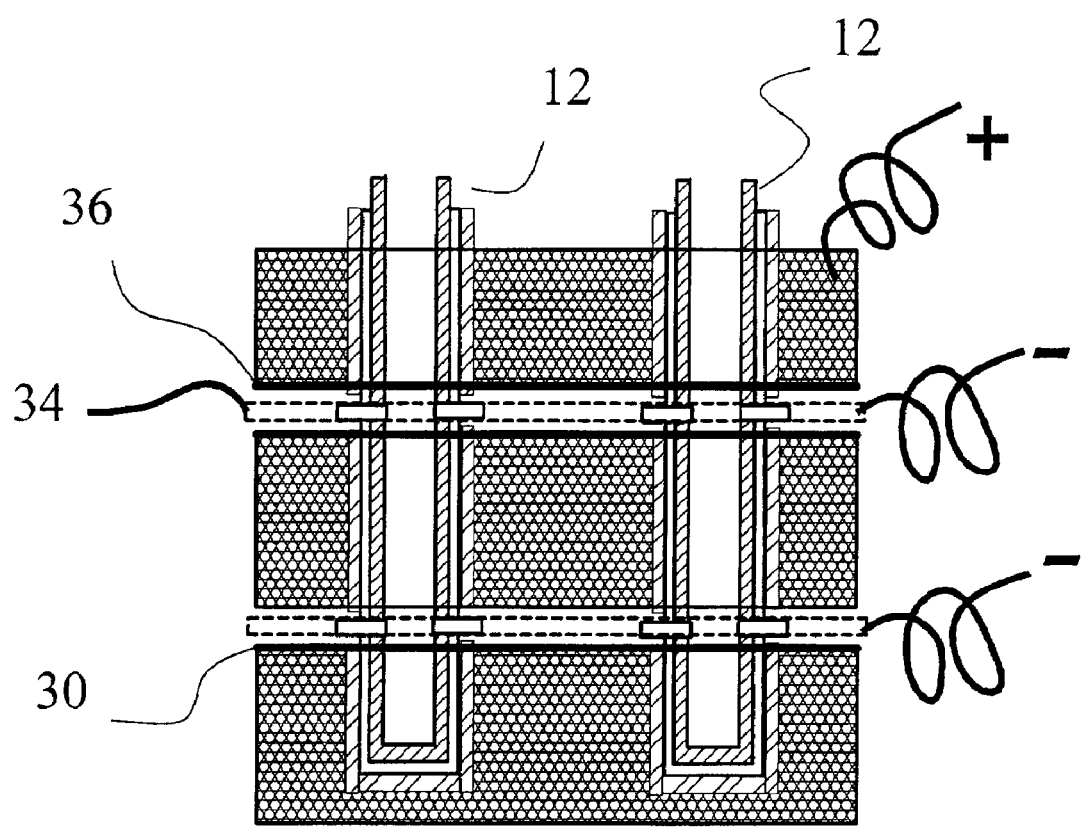
FIG. 8 is a schematic sectional side view of a pair of fuel cells embedded in a porous support matrix and attached to a transverse anode current collector plate.
Figure 9:
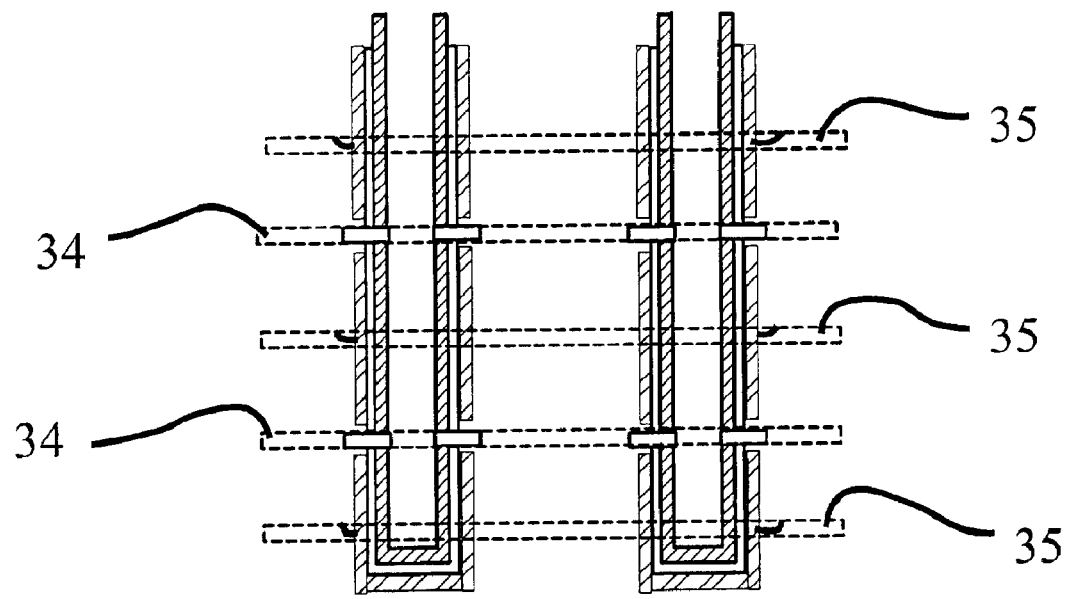
FIG. 9 is a schematic sectional side view of a pair of fuel cells attached to transverse anode current collector plates and transverse cathode current collector plates.
Figure 10:
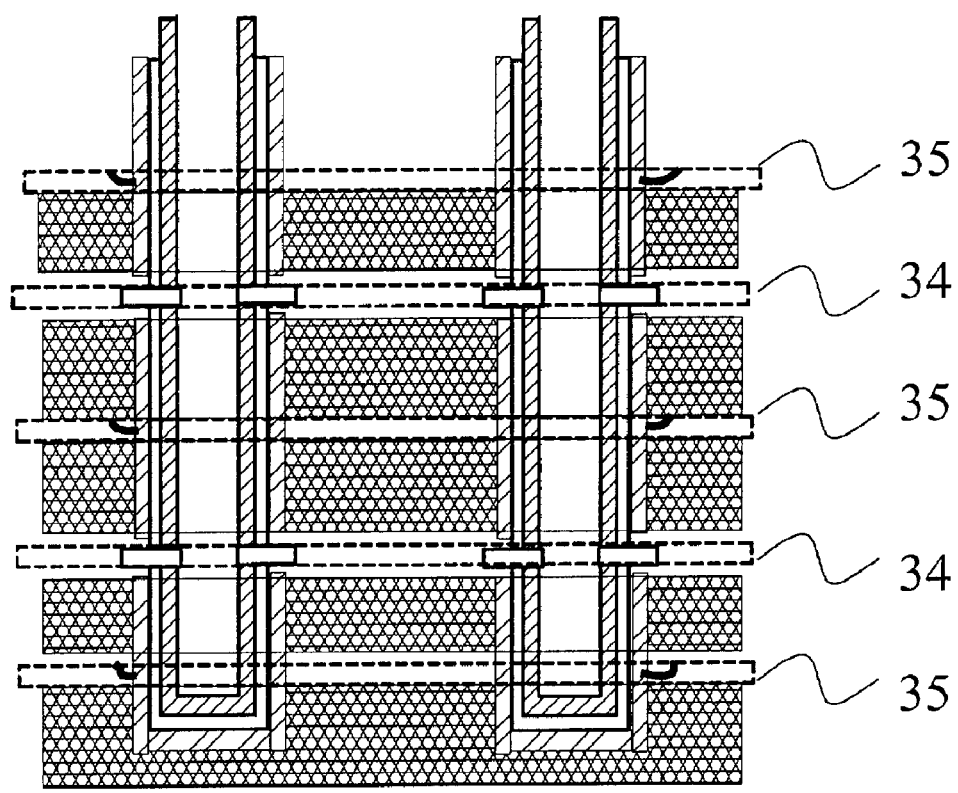
FIG. 10 is a schematic sectional side view of a pair of fuel cells attached to transverse anode current collector plates and transverse cathode current collector plates and embedded in a porous support matrix.

Referring to FIGS. 8 to 10, an alternative approach is illustrated for collecting current from the anode of each fuel cell 12. In this alternative embodiment, a series of anode current collection plates 34 are attached to the tabs 30 such that the plates 34 extend transversely from the length of each fuel cell 12. The plates 34 are made from a suitable material that is electrically conductive and able to withstand SOFC operating conditions; suitable materials include stainless steel, superalloy, and silver. The plates 34 have spaced openings (not shown) for receiving each fuel cell 12 and perforations to allow air/oxidant gas to flow through the plates 34. The plates 34 serve to collect current from the tabs 30 and transmit the current to an external electrical circuit (not shown) connected to the outside edges of the plates 34. The plates 34 may also be constructed with such properties and physically attached to each fuel cell 12 in such a manner that the plates 34 provide structural support to the fuel cells 12 that complements the support provided by the support matrix 20 (as in FIGS. 8 and 10). The plates 34 are electrically isolated from the support matrix 20 by a porous electrical insulator layer 36 that covers both surfaces of each plate 34; the matrix 20 thus are physically and electrically coupled only to the cathodes 16 of each fuel cell 12 whereas the plates 34 are physically and electrically coupled only to the anodes 14 of each fuel cell 12.

Alternatively, and as shown in FIG. 9, transverse plates serve to provide the entire structural support for the fuel cells 12, i.e. the plates replace the support matrix 20. In such case, cathode plates 35 are provided that physically and electrically connect to the cathode 16 of each fuel cell 12. Like the anode plates 34, the cathode plates 35 are made from a suitable material that is electrically conductive and able to withstand SOFC operating conditions, and have spaced openings to receive fuel cells 12 and perforations to allow the transmission of oxidant/air gas therethrough. The cathode plates 35 are electrically connected to the external circuit to return current conducted through the external circuit back to the cathode 16 of each fuel cell 12 for the electrochemical process.

Referring to FIGS. 11 to 25, a plurality of fuel cells 12 can be assembled into a stack 10 to produce commercially useful electrical power levels. These figures show stack configurations that are particularly suitable for certain performance requirements.

Referring to FIG. 11, the fuel cell stack 10 can be formed having a plurality of fuel cells 12 embedded in the support matrix 20. Each of the fuel cells 12 in this stack 10 are electrically connected in parallel, since the support matrix 20 is electrically conductive and is electrically coupled to the cathode 16 of each of the fuel cells 12 in the stack 10. As a result, the effective voltage of the stack 10 is equal to the voltage of the single fuel cell 12 in the stack 10 with the highest voltage and the effective current of the stack 10 is the additive sum of the current produced by each fuel cell 12.

Another stack configuration is shown in FIG. 12. Here, the fuel cell stack 10 can be formed having a mixture of individual fuel cells 12 and fuel cell sub-stacks 40 all embedded in the support matrix 20. A fuel cell sub-stack 40 is one or more fuel cells 12 that are electrically isolated from other fuel cells 12 in the stack 10 in such a manner that the sub-stack 40 can be electrically connected in series with other sub-stacks 40 or fuel cells 12 in the stack 10. Each sub-stack 40 is encased within an electrical or a thermal and electrical insulator 42. The insulator 42 prevents the support matrix 20 inside the sub-stack 40 ("sub-stack matrix") from electrically contacting the support matrix 20 outside the sub-stack 40 ("stack matrix"), thereby preventing the fuel cells 12 inside the sub-stack 40 from short-circuiting with other fuel cells 12 or sub-stacks 40 in the stack 10. Current may be collected from the ends of each fuel cell 12.

The insulator 42 is a flexible sheet that wraps around the sub-stack 40; the sheet extends the length of the fuel cells 12, and may be made of $Al_2O_3$ (dense or porous), ceramic felt, or a composite material of an exterior metal shell with an interior insulating ceramic lining. Alternatively, the insulator 42 may be a rigid two-layered shell having an exterior ceramic layer and an interior conducting metal lining.

Another stack configuration is shown in FIG. 13. Here, a stack 44 comprises a plurality of small diameter tubular fuel cells 12 embedded in the support matrix 20 in a parallel electrical connection like that shown in FIG. 11. However, this stack configuration differs from that shown in FIG. 11 in that the small-diameter fuel cells 12 ("inner fuel cells") are located within a large-diameter tubular fuel cell 13 ("outer fuel cell"). The outer fuel cell 13 may be made from the same materials and by the same method (described below) as the inner fuel cells, or by materials and techniques known in the art for making large-diameter fuel cells, e.g. by extrusion. The outer fuel cell 13 differs from the inner fuel cells 12 in that the inner electrode layer is the cathode 16 and is physically and electrically connected to the support matrix 20, and the outer electrode layer is the anode 14. A container 46 contains the outer fuel cell 13 in such a manner that space is provided between the container inner wall and the anode surface of the outer fuel cell 13 thereby creating a fuel delivery channel 48 for flowing fuel to the anode of the outer fuel cell 13. Spacers (not shown) may be provided to fix the stack 10 to the container 46.

The fuel cell stack 50 shown in FIG. 14 is the same as the stack 44 in FIG. 13 except that porous matrix material is substituted for the spacers in the fuel delivery channel 48.

If the container 46 is removed from the fuel cell stacks 10 of FIGS. 13 and 14, the stacks 10 resemble a "tubes-within-a-tube" fuel cell assembly, and can replace a single large diameter fuel cell in known fuel cell systems for large diameter fuel cells (i.e. larger than 5 mm in diameter). Because of the plurality of small diameter fuel cells within the large diameter fuel cell, a tubes-within-a-tube fuel cell assembly is expected to provide a higher power output than a conventional single large-diameter fuel cell tube.

Figure 15:
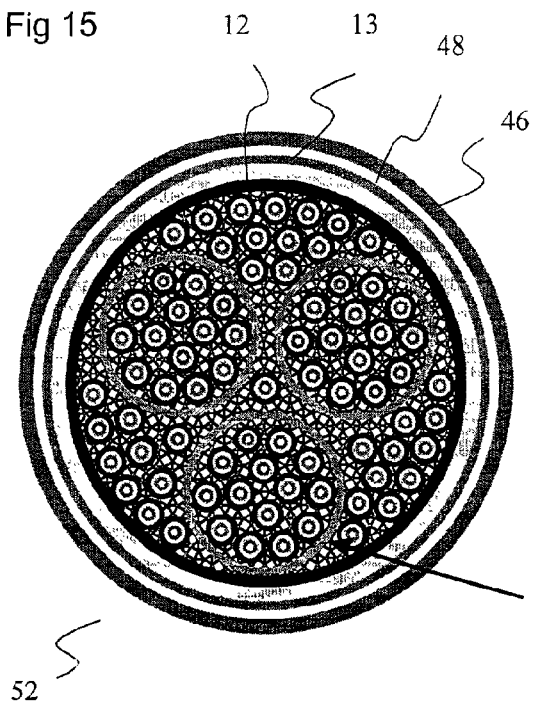
FIGS. 15 and 16 are schematic end views of two different fuel cell stack designs that each comprise a plurality of fuel cell sub-stacks and inner tubular fuel cells embedded in a foam-like porous support matrix and located inside an outer tubular fuel cell.
Figure 16:
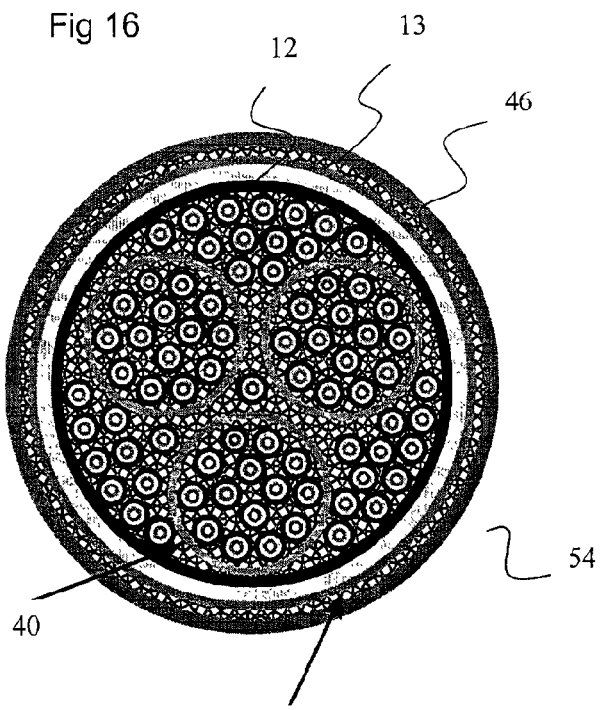

FIGS. 15 and 16 illustrate another pair of stack configurations 52, 54. Essentially, these are additional tubes-within-a-tube design; however, here, the small-diameter fuel cells 12 are arranged in the same manner as that shown in FIG. 12. The stack 10 shown in FIG. 15 is attached to the container 46 by spacers, and the stack 10 shown in FIG. 16 is attached to the container 46 by the porous matrix material.

Figure 17:
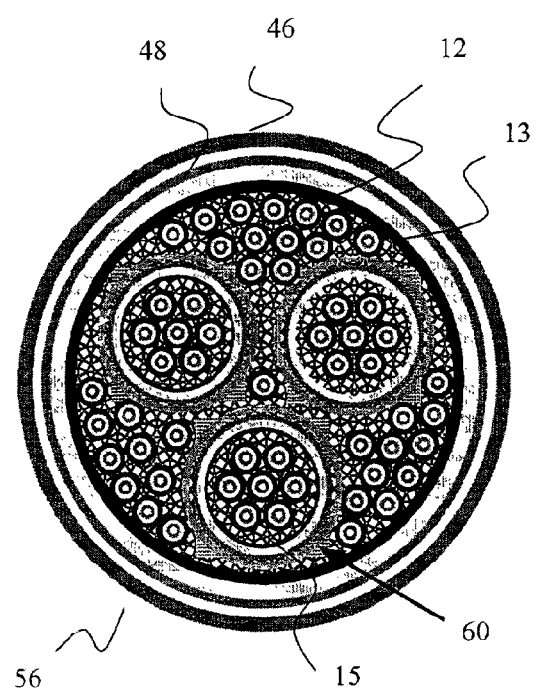
FIGS. 17 and 18 are schematic end views of two fuel cell stack designs that each comprise a plurality of small-diameter and intermediate-diameter fuel cells embedded in a foam-like porous support matrix and located inside an large-diameter outer tubular fuel cell.
Figure 18:
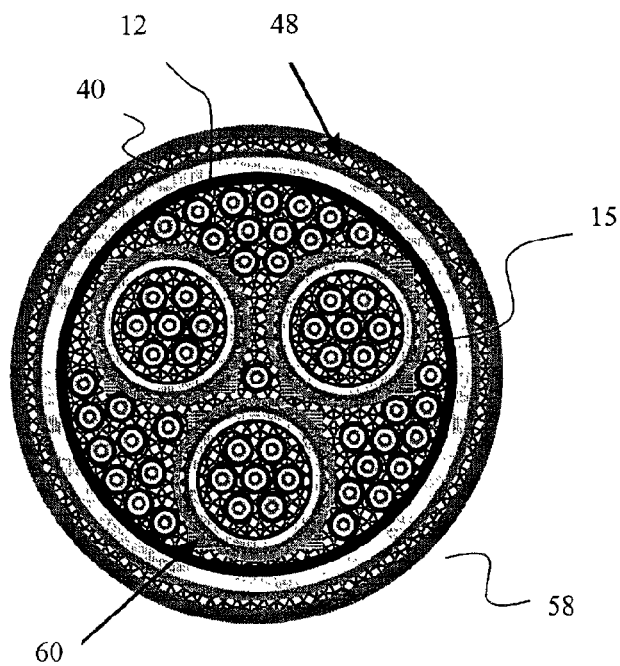

FIGS. 17 and 18 illustrate another tubes-within-a-tube fuel cell assembly 56, 58. Tubes-within-a-tube fuel cell assemblies 56, 58 comprise a plurality of small-diameter fuel cells 12 and fuel cell sub-stacks 60 arranged in generally the same manner as shown in FIGS. 15 and 16. However, the sub-stacks 60 in this configuration differ from the sub-stacks 40 shown in FIG. 15 and 16: instead of an insulator 42 surrounding the fuel cells 12, each sub-stack 60 is enclosed inside an intermediate fuel cell 15 that has a smaller diameter than the large-diameter outer fuel cell 13, and a larger diameter than the small-diameter inner fuel cells 12.

Figure 19:
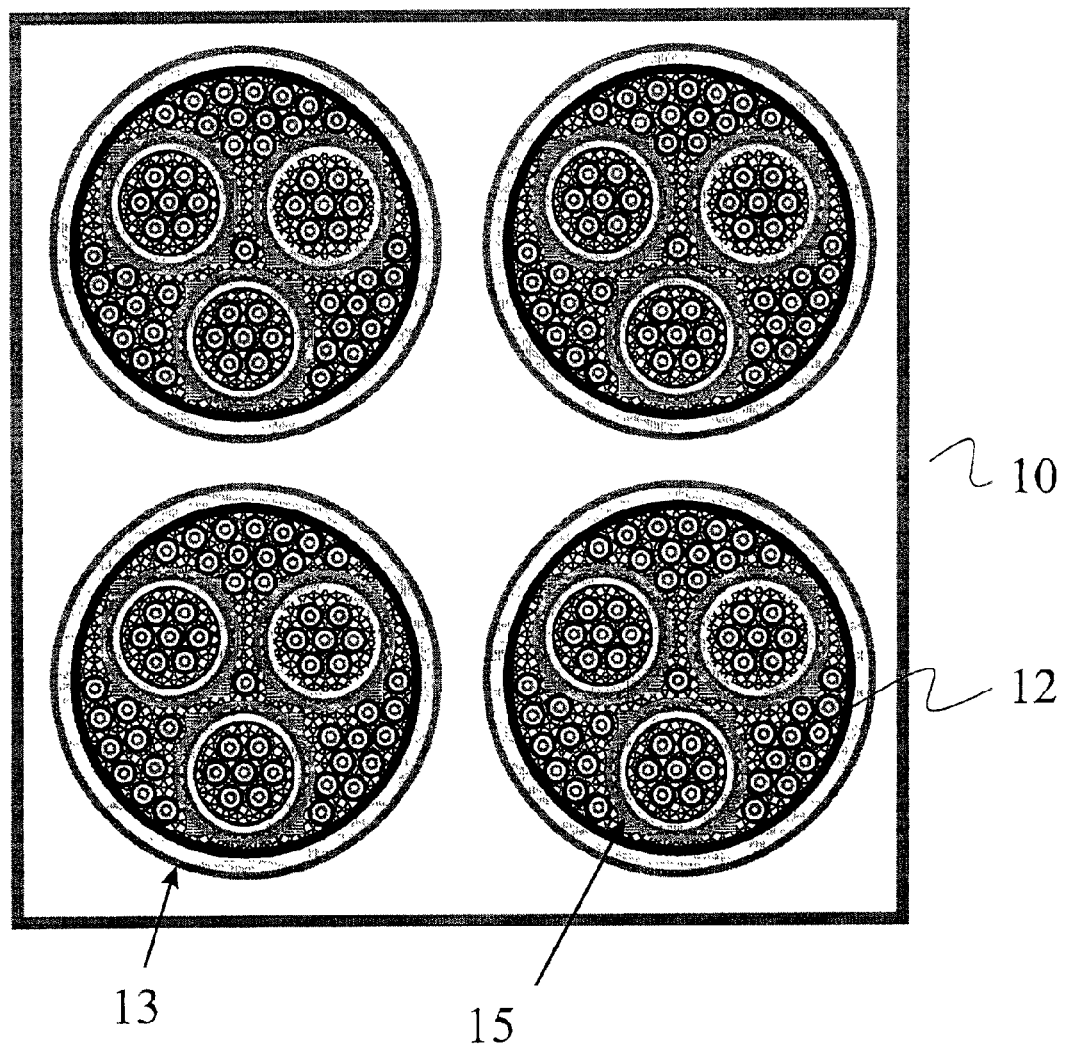
FIG. 19 is a schematic end view of a fuel cell system comprising a plurality of the fuel cell stacks of FIG. 17.
Figure 20:
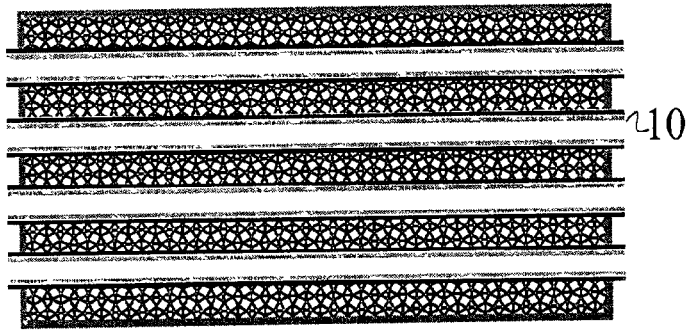
FIG. 20 is a schematic sectional longitudinal view of a fuel cell stack having a plurality of inner tubular fuel cells embedded in a porous, foam-like support matrix.

The fuel cell stacks 56, 58 are located inside the container 46 in the same manner as the stacks 52, 54 respectively. Alternatively, the stacks 56, 58 without the container 46 may serve as tubes-within-a-tube fuel cell assemblies and be assembled with other stacks in a conventional large-diameter fuel cell system as discussed above. FIG. 19 shows a stack of the fuel cell assemblies of FIGS. 17 and 18 arranged in series, or in parallel inside a larger thermal enclosure.

Figure 21:
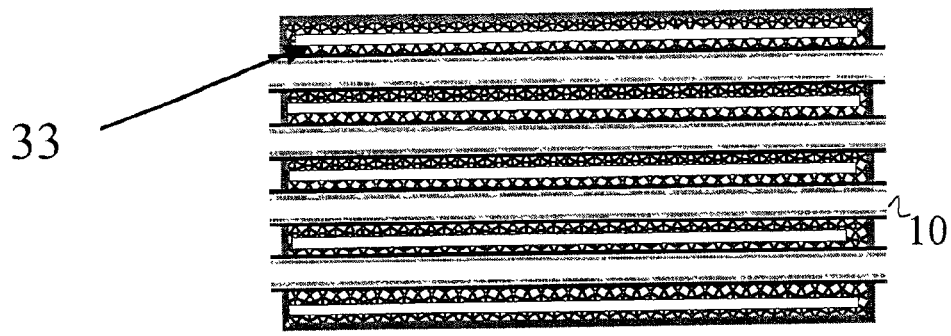
FIG. 21 is a schematic sectional longitudinal view of the fuel cell stack of FIG. 20 having a plurality of longitudinal fluid flow channels in the matrix.
Figure 22:
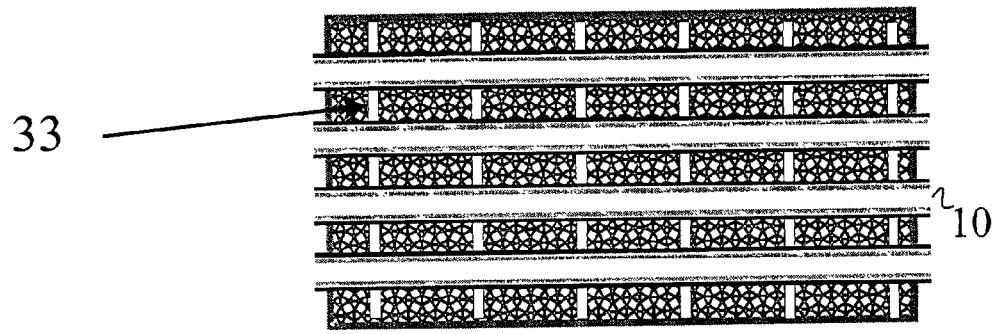
FIG. 22 is a schematic sectional longitudinal view of the fuel cell stack of FIG. 20 having a plurality of transverse fluid flow channels in the matrix.
Figure 23:
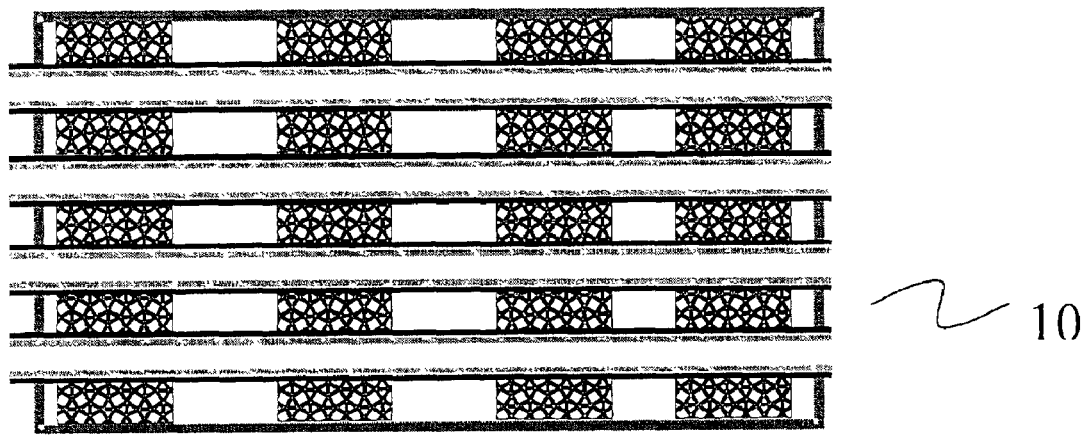
FIG. 23 is a schematic sectional longitudinal view of a fuel cell stack having a plurality of tubular fuel cells embedded in a discontinuous porous foam-like support matrix.
Figure 24:
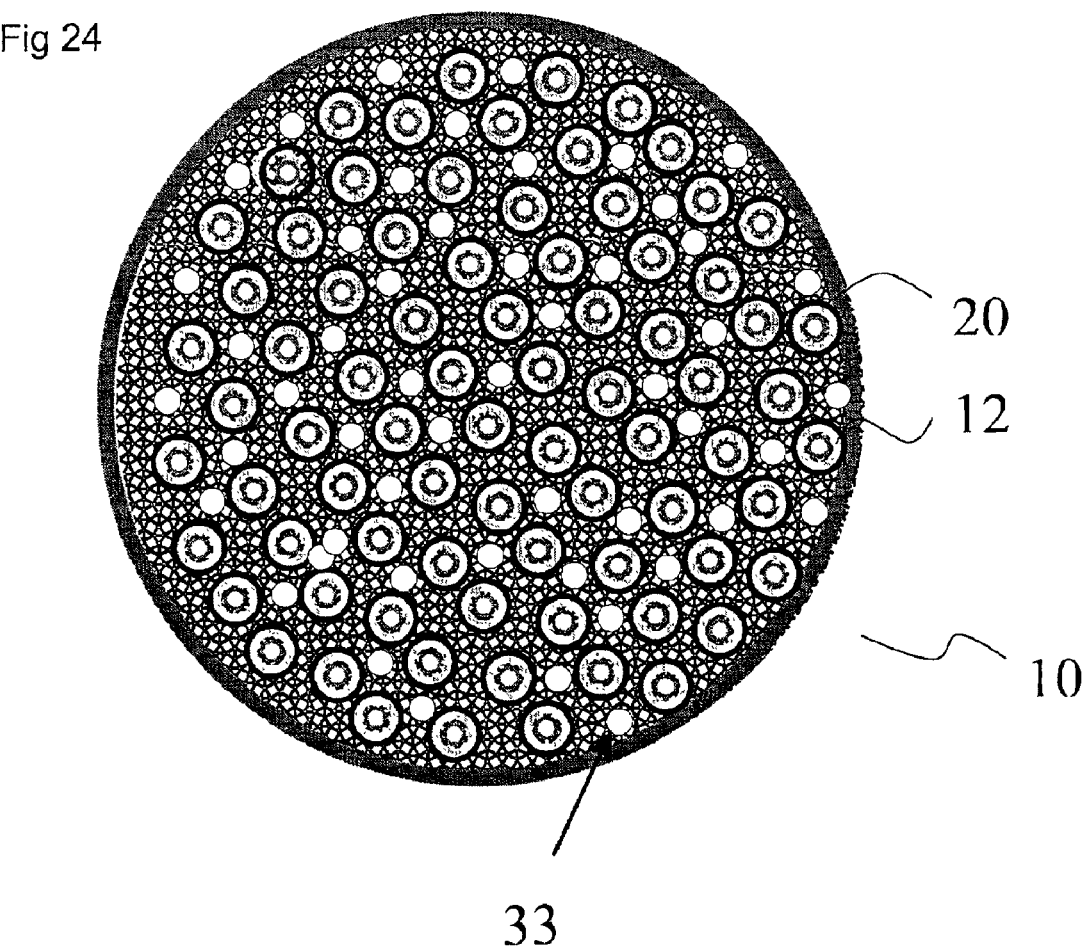
FIG. 24 is a schematic end view of a fuel cell stack having a plurality of tubular fuel cells embedded in a porous, foam-like support matrix and a plurality of longitudinal fluid flow channels in the matrix.

Referring to FIGS. 20–24, the small-diameter fuel cells 12 extend the length of the stack 10 such that the ends of each inner fuel cell 12 are open at each end of the stack 10 and are free of matrix material, and can be electrically connected to the external circuit. Referring to FIGS. 21 and 22, the matrix 20 may be provided with distribution channels 33 that enhance the flow of reactant through the matrix 20 and to the electrode surface of each small-diameter fuel cell 12 (as shown also in FIG. 7); FIG. 21 shows a series of longitudinal distribution channels 33 substantially parallel with the small-diameter fuel cells 12 (see also FIG. 24), and FIG. 22 shows a series of transverse distribution channels 33 that are perpendicular to the small-diameter fuel cells 12. As will be discussed below, these channels 33 can be formed by inserting combustible members that burn away during a sintering treatment to leave behind the channels 33, or, can be formed from the gaps left by a porous matrix structure that is discontinuous along the length of the fuel cells 12, as shown in FIG. 23. A plan view of a series of longitudinally extending channels 33 interspersed within the fuel cells 12 is shown in FIG. 24.

Figure 25:
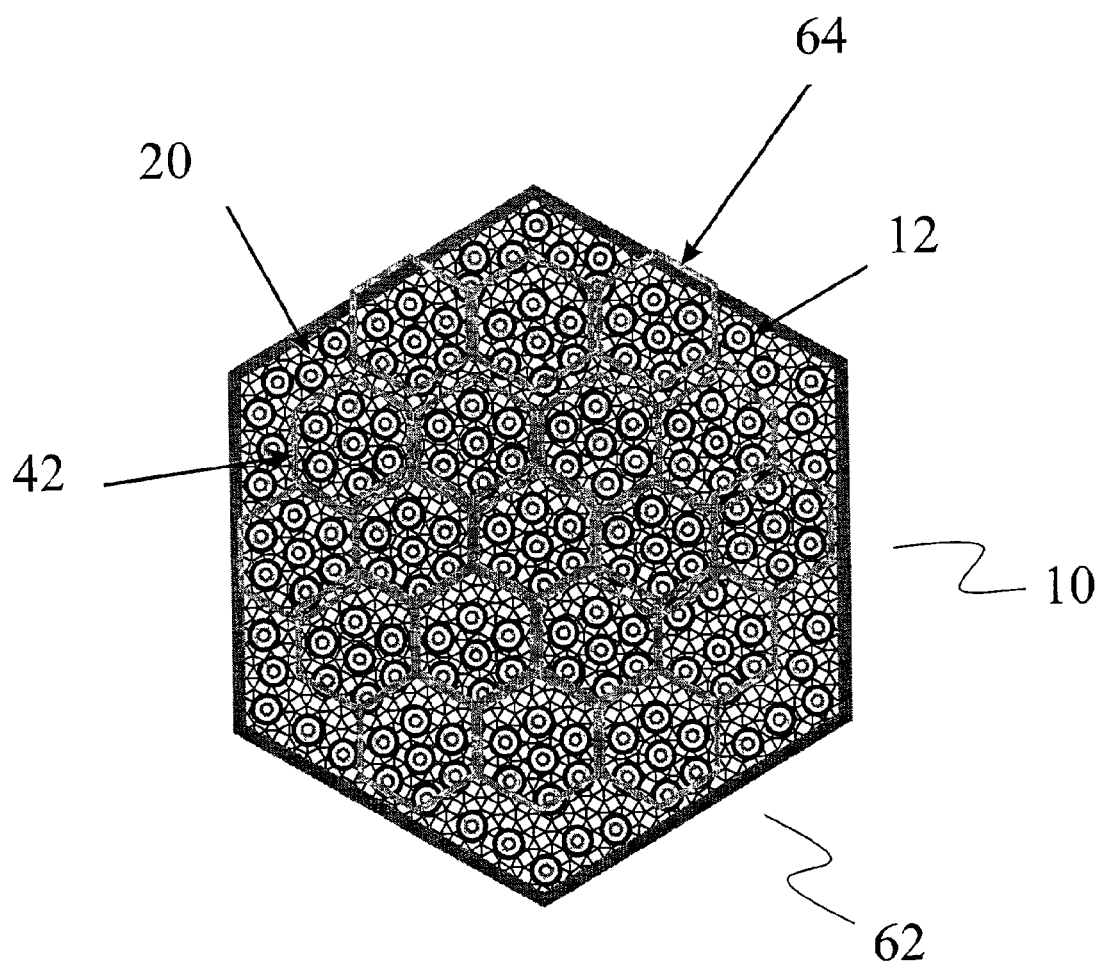
FIG. 25 is a schematic end view of a fuel cell stack having a plurality of hexagonal sub-stacks each having a plurality of tubular fuel cells therein.

Referring to FIG. 25, a hexagonal-shaped fuel cell stack 62 is provided having 25 sub-stacks 64. Each sub-stack 64 has 7 single fuel cells 12. As an illustrative example, when each fuel cell 12 is rated at 0.7 V, 1.43 A and 1 W, each 7 cell sub-stack 64 produces 7 W. As the single cells in the 7 cell sub-stack 64 are connected in parallel, the voltage output from the sub-stack 64 equals the voltage from a single cell 12, i.e. 0.7V, and the current will be additive sum of the current produced by each cell 12, i.e. 1.43×7=10 A.

Given that the sub-stacks 64 are electrically insulated from each other, the stack 62 can be electrically connected in different ways to produce different outputs. The electrical connections are established at the ends of each cells, and are known in the art.

In one embodiment, all 25 sub-stacks 64 can be connected in parallel, and in such case,

| stack power | 7 W × 25 sub-stacks = 175 W |
|---|---|
| stack voltage | 0.7 V |
| stack current | 10 A × 25 sub-stacks = 250 A |

In another embodiment, the stack 62 may be divided into 5 electrically isolated sub-groups, each group having 5 sub-stacks. The 5 sub-stacks in each group are connected in parallel, and the 5 groups are connected in series. In such case, each sub-stack produces 7 W, 0.7V and 10 A, each group produces 35 W, 0.7V and 50 A, and

| stack power | 35 W × 5 groups = 175 W |
|---|---|
| stack voltage | 0.7 V × 5 groups = 3.5 V |
| stack current | 50 A |

In another embodiment, the 5 sub-stacks in each group are connected in series, then for each group, the power output is 35 W, voltage is 3.5V and the current is 10 A. If the groups are connected in series,

| stack power | 35 W × 5 groups = 175 W |
|---|---|
| stack voltage | 3.5 V × 5 groups = 17.5 V |
| stack current | 10 A |

If the groups are connected in parallel,

| stack power | 35 W × 5 groups = 175 W |
|---|---|
| stack voltage | 3.5 V |
| stack current | 175 W / 3.5 V = 50 A |

FIGS. 26 to 30 show various fuel cell system designs that incorporate one of the fuel cell stack configurations as described above. Generally speaking, the fuel cell system includes oxidant and fuel delivery and discharge means, the fuel cell stack, a thermal enclosure for the stack, and electrical leads for connecting the stack to an external electrical circuit.

Figure 26:
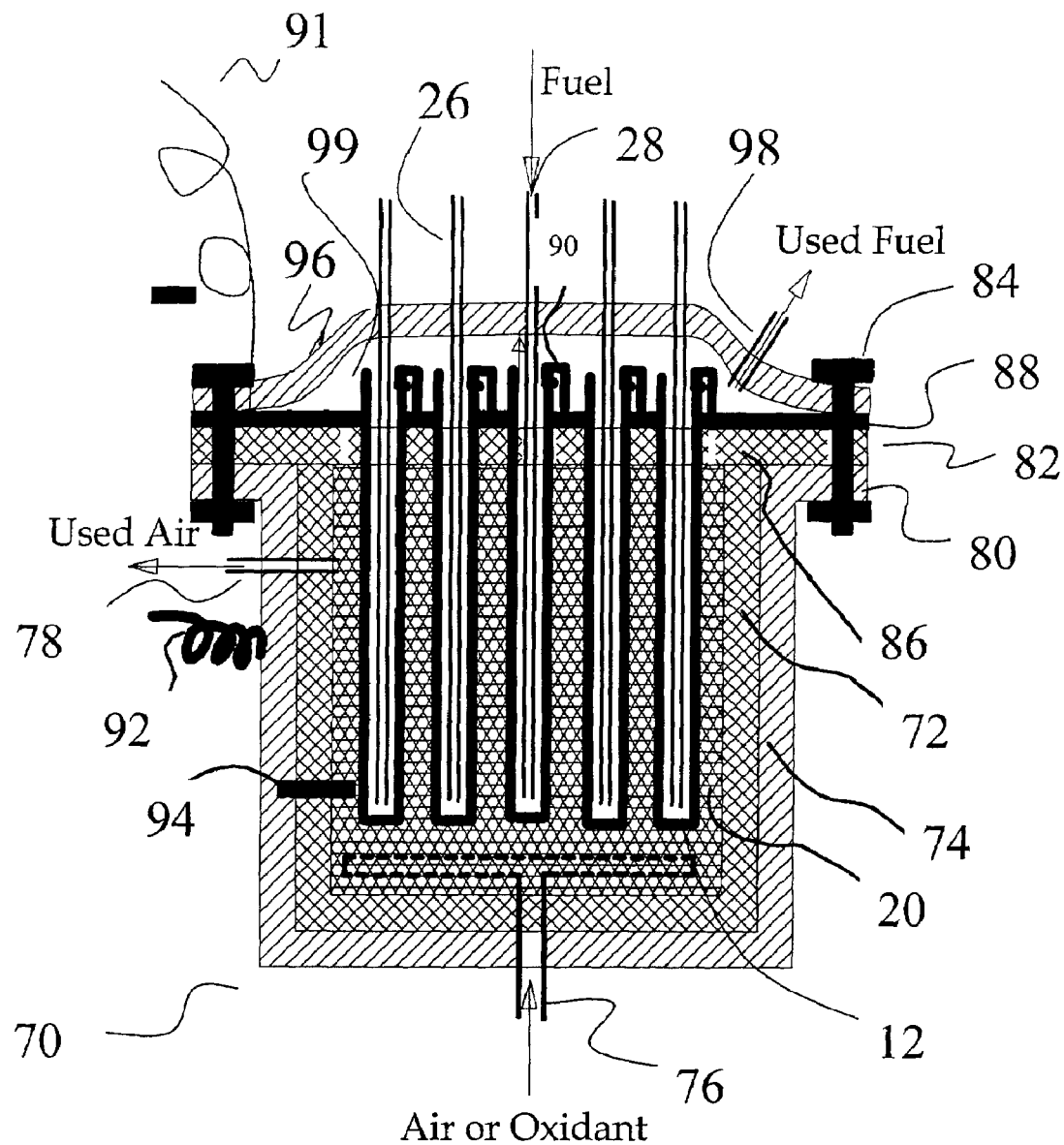
FIG. 26 is a schematic sectional side view of a fuel cell system having a stack of tubular SOFCs each closed at one end and having an oxidant inlet channel at the bottom of the system.

FIG. 26 illustrates a simple fuel cell system 70 design having a stack 10 of one-ended fuel cells 12 embedded in the support matrix 20. The stack 10 is contained inside a cup-shaped thermal insulator layer 72 made of a suitable ceramic material such as aerogel or another like porous ceramic, ceramic felt or another like fibrous ceramic such as Saffil. The stack 10 and insulator layer 72 are contained inside a cup-shaped casing 74. A suitable material for the casing 74 is a ceramic such as alumina, zirconia, alumina-zirconia composite, spinel, silica, ceramic aerogel, or porous ceramics where the pores are disconnected. The casing 74 may have two layers wherein the outer layer is made of a steel or aluminum, and the inner layer is made of ceramic. Air inlet and outlet conduits 76 and 78 are provided through the insulator 72 and casing 74 for the delivery of air/oxidant to and from the stack 10.

The casing 74 has an annular lip 80 that extends outwards around the periphery of the rim of the casing 74. The lip 80 enables the mounting of a lid 82 via a plurality of electrically non-conductive fasteners 84 in such a manner that a fluid seal is established between the lid 82 and the casing 74. The lid 82 has a thermal and electrical insulator layer 86 of similar construction to the insulator layer 72, and a reactant impermeable electrically conductive metal layer 88 in contiguous adjacent contact with the insulator layer 86. The metal layer 88 is electrically connected to the anode of each fuel cell 12 via anode connectors 90 and is electrically connected to an external circuit via anode lead 91. The casing 74 is electrically connected to the external electrical circuit via cathode lead 92 and electrically coupled to the cathode of each fuel cell 12 via a cathode connector 94, which is electrically connected to the casing 74 and the support matrix 20.

A dome-shaped fuel discharge chamber cover 96 is fastened over the lid 82 via fasteners 84 to establish a fluid seal between the cover 96 and the lid 82. The cover 96 is provided with openings that receive the feed tube 26 of each fuel cell 12, and with a fuel discharge outlet 98. A fuel discharge chamber 99 is defined by the space inside the cover 96 and lid 82; the chamber 99 is fluidly coupled to the fuel outlet of each fuel cell 12.

In operation, fuel is fed into each fuel cell 12 of the system 70 via the inlet 28 of each fuel cell feed tube 26. Oxidant is fed into the support matrix 20 via the oxidant feed tube 76. Fuel and oxidant are electrochemically reacted at the anode and cathode of each fuel cell 12, respectively. Unused fuel and reaction products exit the fuel cells 12 into the fuel discharge chamber 99 and are discharged from the fuel cell system through the fuel discharge outlet 98. Unused oxidant and reaction products are discharged through the outlet channel 78. Electrical current generated as a result of the electrochemical reactions are conducted between the electrical circuit via anode and cathode leads 91, 92.

Figure 27:
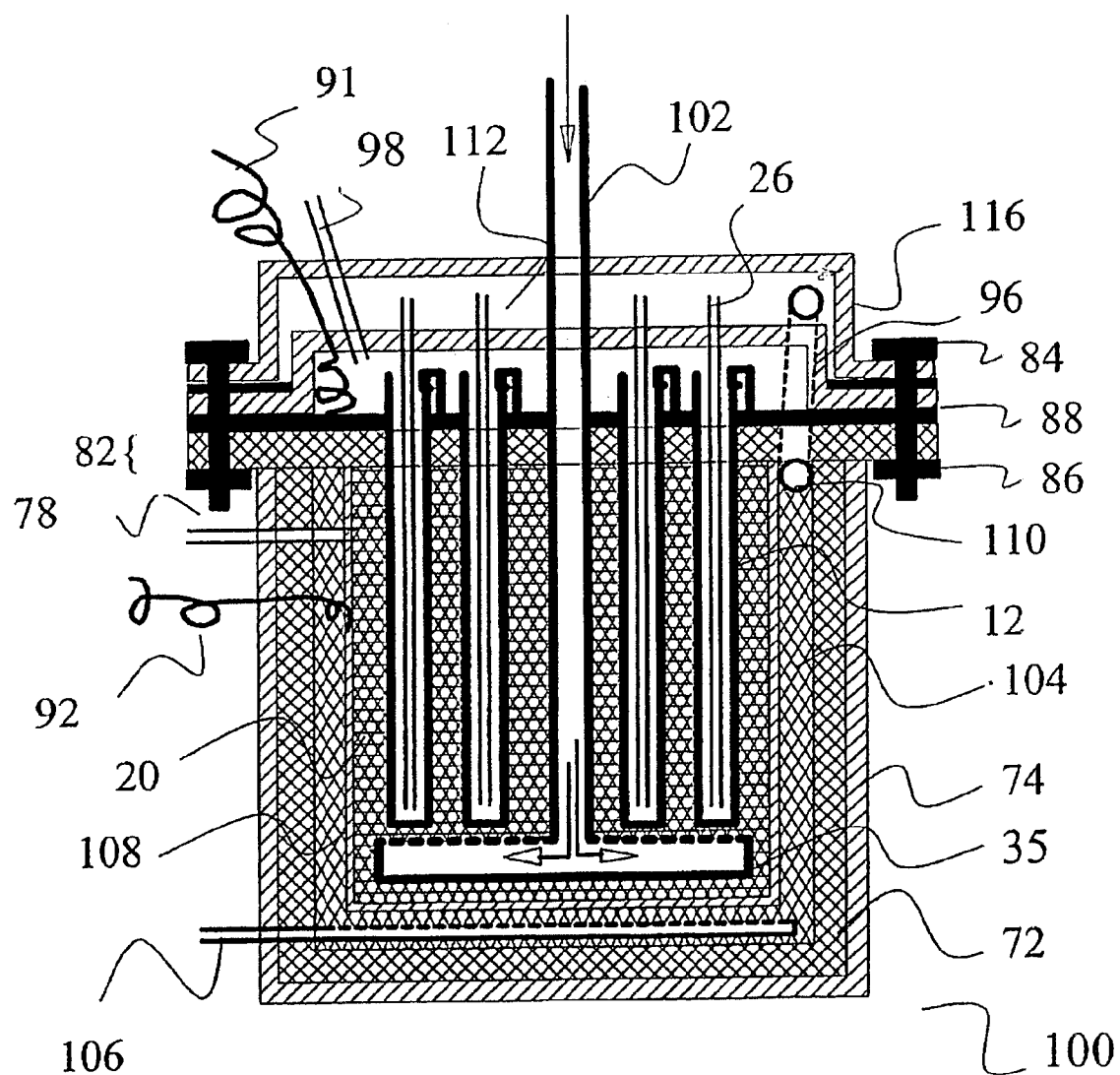
FIG. 27 is a schematic sectional side view of a fuel cell system having a stack of tubular SOFCs each closed at one end and having a fuel gas reformer surrounding the stack.

Referring now to FIG. 27, a fuel cell system 100 is provided that has a similar design to the system 70 shown in FIG. 26, except for the following notable differences. First, an air/oxidant inlet 102 extends into the support matrix 20 from the top of the system 100. Second, a fuel gas reformer 104 is provided to reform a suitable supply fuel (e.g. natural gas) into hydrogen. Supply fuel is delivered to the reformer 104 via a fuel supply inlet conduit 106 fluidly coupled to the reformer 104; the fuel supply inlet conduit 106 has a discharge portion comprising a plurality of perforations that discharge fuel into the bottom of the reformer 104. The reformer 104 has a reformer chamber being the space between two cup-shaped layers, namely, the insulator layer 72 and a cup-shaped metal current-collecting layer 108. The top of the reformer chamber is closed by the lid 82. The chamber is filled with a catalyst-coated foam-like porous matrix structure. Near the top rim of the reformer 104 is a reformer outlet 110 that discharges reformed fuel from the reformer chamber into a fuel supply chamber 112 via a fuel supply conduit (shown coupled to the reformer outlet 110 and in dotted line in FIG. 27). The fuel supply chamber 112 is a cavity within a dome-shaped fuel supply chamber cover 116 and the fuel discharge chamber cover 96.

The cathode current collecting layer 108 is in contiguous adjacent contact with the fuel cell stack 10, and more particularly, in electrical contact with the support structure 20. The cathode current collecting layer 108 is also electrically connected to cathode lead 92. The stack 10, cathode current collecting layer 108, reformer 104 and insulating layer 72 are all enclosed inside the outer casing 74 and lid 82.

In operation, natural gas supply fuel is delivered to the bottom of the reformer chamber by the fuel inlet conduit 106. As the fuel travels upwards through the catalyst-coated matrix in the reformer chamber, it is reformed into hydrogen and is discharged from the reformer 104 through the reformer outlet 110 and into the fuel supply chamber 112. Hydrogen fuel in the fuel supply chamber 112 is then fed into each fuel cell 12 via the feed tube 26. Heat from the electrochemical reaction reforms the natural gas supply fuel into hydrogen; in this connection, the current collecting layer 108 is made of a material that is a good heat conductor. As the reforming process is endothermic, the reformer 104 serves an additional useful function of cooling the stack 10. The remainder of the system operation is similar to the system 70 as shown in FIG. 26.

Figure 28:
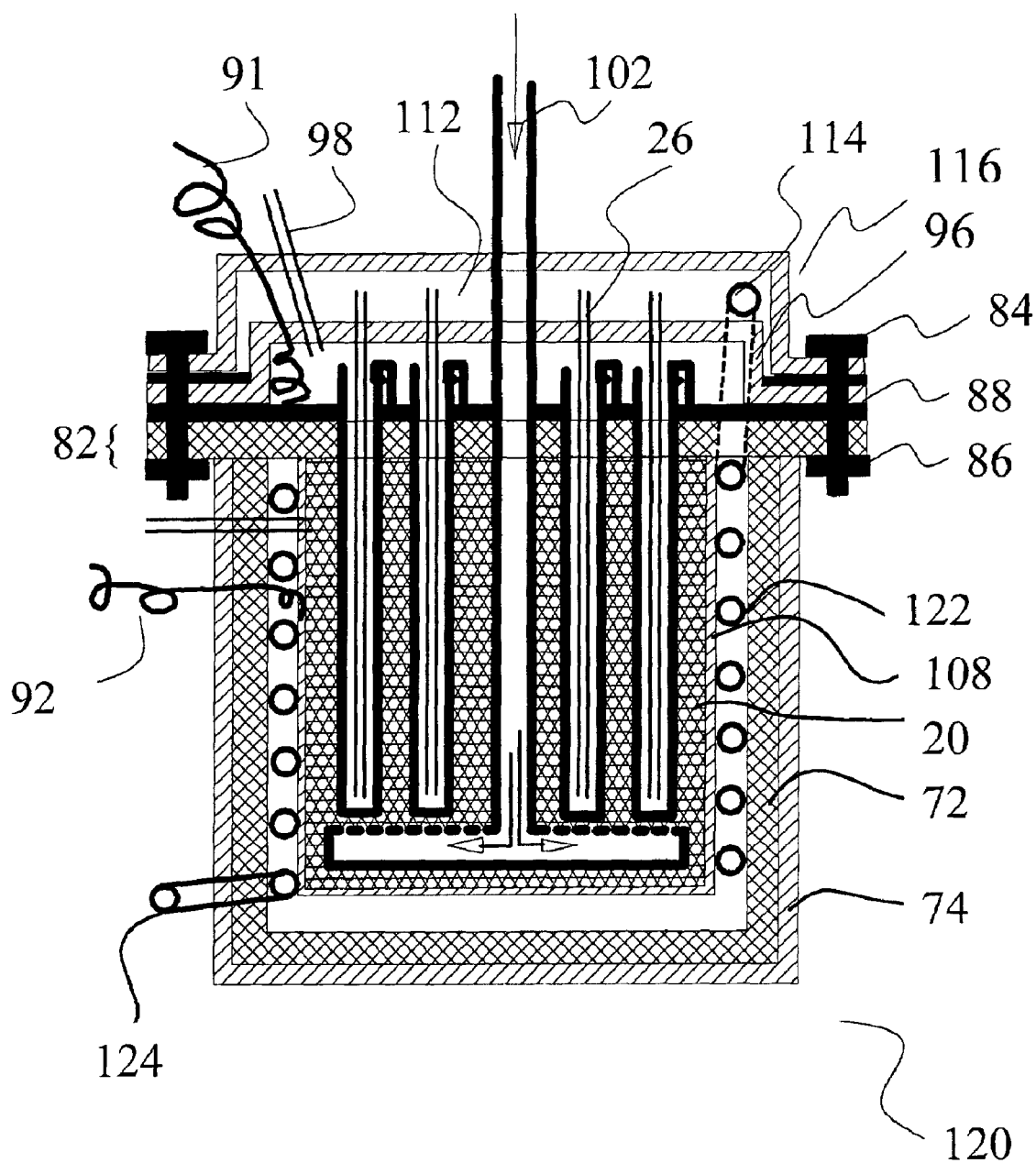
FIG. 28 is a schematic sectional side view of a fuel cell system having a stack of tubular SOFCs each closed at one end, and a fuel gas reformer tube wrapped around the stack.

Another fuel cell system 120 is shown in FIG. 28. This system 120 is similar to the system shown in FIG. 27 except that a reformer channel 122 is provided that winds around the reformer chamber. This shape is deliberately selected to lengthen the reformer pathway, thereby increasing the effectiveness of the reforming process. A fuel supply inlet 124 fluidly connected to the upstream end of the reformer channel 122 replaces the fuel supply inlet 106 shown in FIG. 27. The downstream end of the reformer channel 122 is fluidly coupled to the fuel supply chamber 112.

Figure 29:
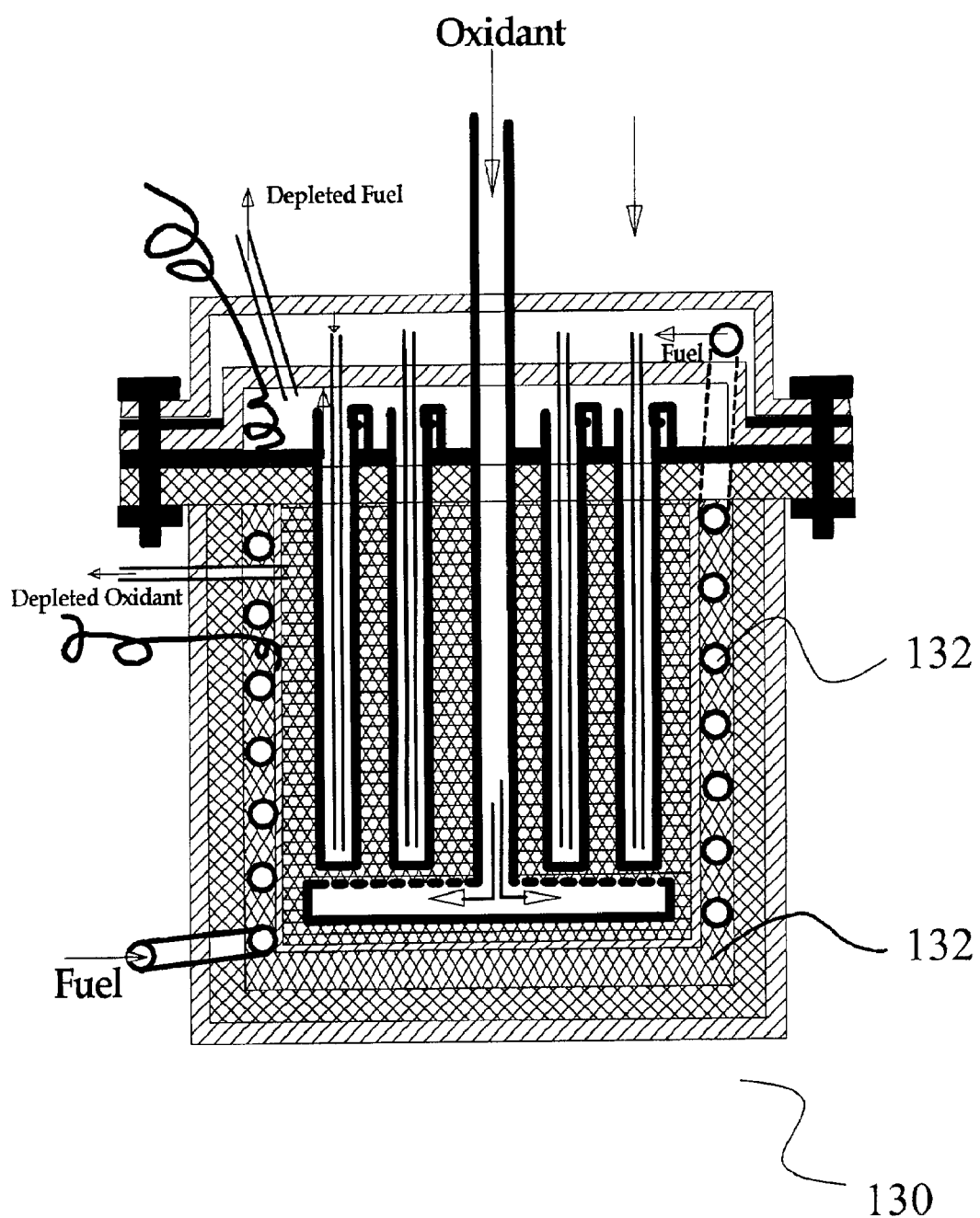
FIG. 29 is a schematic sectional side view of the system of FIG. 30 with the reformer tube embedded in a heat conductive matrix structure.

The fuel cell system 130 illustrated in FIG. 29 is identical to the system 120 illustrated in FIG. 28, except that the reformer channel 122 is embedded in a support matrix material 132 to improve the heat conduction from the reformer enclosure to the reformer channel 122.

Figure 30:
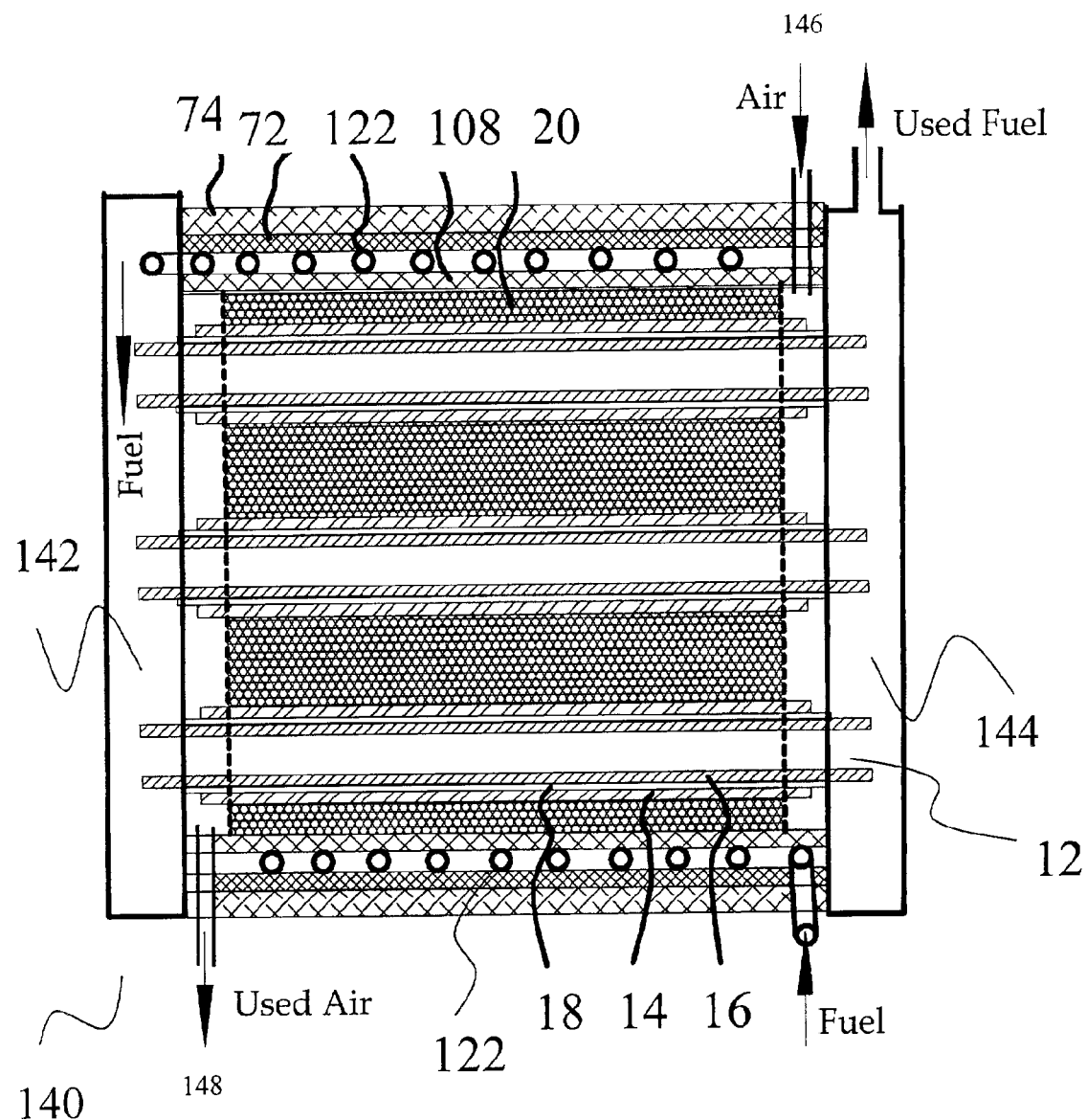
FIG. 30 is a schematic sectional side view of a fuel cell system having a stack of tubular SOFCs each open at both ends, and a fuel gas reformer tube wrapped around the stack.

FIG. 30 illustrates another fuel cell system 140 design having a stack 10 of elongate two-ended fuel cells 12 embedded in the support matrix 20. The ends of the stack 10 are capped by a fuel delivery manifold 142 and a fuel discharge manifold 144. The manifolds 142, 144 have openings that receive the ends of each fuel cell 12 in the stack 10 such that a fluid seal is established between the inside of each fuel cell 12 and the respective manifolds 142, 144. This enables fuel to be delivered to and from each fuel cell 12 in fluid isolation from the oxidant pathway. Oxidant is fed into and out of the fuel cell stack via an oxidant inlet 146, and outlet 148, respectively. The stack is surrounded by a cylindrical shaped insulator 72 and outer casing 74. Between the insulator and a metal cathode current collecting layer 108 are the spiral reformer channels 122.

Manufacture

A method of manufacturing the tubular fuel cells 12 and of embedding these fuel cells 12 in the porous support matrix 20 is described in the following paragraphs.

A. Forming a Tubular Fuel Cell

As discussed above, the process for making a small diameter tubular SOFC by producing an inner electrode and electrolyte by EPD is described in Applicant's PCT application no. PCT/CA01/00634. The outer electrode layer of the fuel cell may be formed by applying a LSM layer onto the electrolyte 18 by one of dip-coating, painting as known in the art, or by EPD.

B. Producing a Stack or Sub-stack of Fuel Cells

A plurality of fuel cells 12 can be assembled into a stack 10 or sub-stack 40 for use in a fuel cell system. To hold the fuel cells 12 in place, the fuel cells 12 are embedded in a relatively rigid but porous foam-like support matrix 20 that serves as a support structure. If made with certain materials, the support matrix 20 can also serve as part of the cathode 16, by collecting current and conducting oxygen (oxide) ions to the electrolyte 18.

Figure 31:
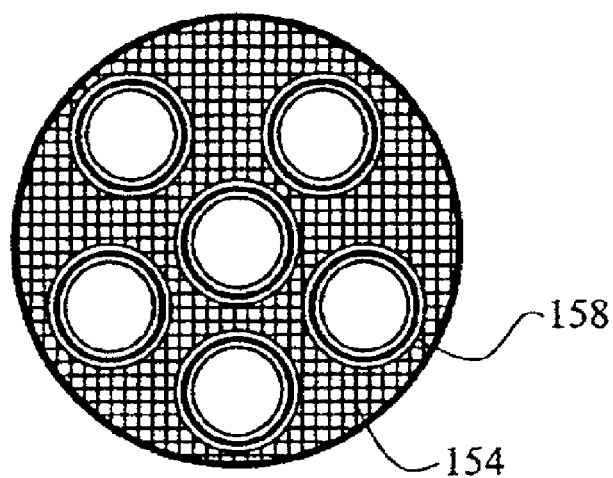
FIGS. 31 and 32 are schematic top and side views of an apparatus for embedding a group of fuel cells in the support matrix.
Figure 32:
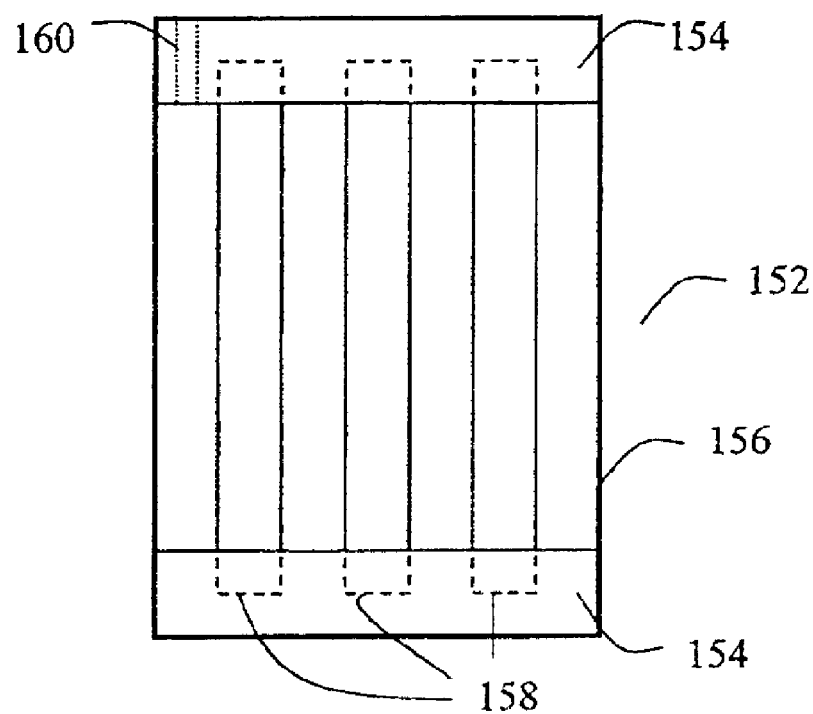

There are different processes to embed fuel cells in the porous matrix. According to one process, and referring to FIGS. 31 and 32, an apparatus 152 is provided for immersing a plurality of fuel cells 12 in a slurry of matrix material. The apparatus 152 comprises a pair of end plates 154 made of a ceramic, superalloy or another material capable of withstanding sintering, a combustible flexible sheet 156, and means for supplying the slurry to the container (not shown). The end plates 154 each have a plurality of indentations 158 on one of their major faces; the indentations 158 are shaped and sized to accept the ends of fuel cells 12. The flexible sheet 156 may be made of paper board or a suitable plastic material. Upon sintering (described below), the flexible sheet 156 burns away. Alternatively, the flexible sheet 156 may be replaced by a non-combustible container wall (not shown) of ceramic such as alumina or zirconia, or metal. Such container serves to contain the slurry during heat treatment/sintering, but can also serve as an integral component of the fuel cell stack 10.

Each end of each fuel cell 12 is taped with a protective masking tape (not shown) or a suitable combustible coating to keep the ends free from the slurry. Then, each end plate 154 is clamped to each end of each fuel cell 12, holding each fuel cell 12 in place. Then, the flexible sheet 156 is wrapped around the fuel cells 12; the sheet 156 is large enough to wrap completely around the fuel cells 12 and to attach to each end plate 154. When wrapped, the sheet 156 and end plates 154 form a cylindrical container that encloses the fuel cells 12. A slurry injection port 160 is provided in one of the base plates.

The slurry is a suspension of the matrix material, water or organic solvent, a dispersant, a foaming agent, organic monomers and an initiator. The matrix material in this case is LSM (lanthanum strontium manganate), but can be any ceramic and/or metal powder having suitable properties, such as $LaCr(Mg)O_3$, doped $LaCrO_3$ ($La_{1-x}Sr_xCrO_3$, $La_{1-x}Ca_xCrO_3$, $La_{1-x}Mg_xCrO_3$, $LaCr(Mg)O_3$, $LaCa_{1-x}Cr_yO_3$, $La_{1-x}Sr_xCO_{1-y}F_{cy}O_3$, stainless steel (316, 316L), cement (such as Ni-Yittria stabilized zirconia or any Ni and doped zirconia cermet, Ni doped—$CeO_2$ cermet, Cu doped-ceria cermet), silver and its alloys, Inconel steel or any superalloy, or ferritic steel SiC, $MoSi_2$. The organic monomers may be mehty methacrylate, butyl arcylate, acrylamide, or other acrylates. The dispersant may be polyacrylic acid. The foaming agents may be Tergiton TMN10 or Triton X114. The initiator may be ammonium persulphate (APS). The slurry upon heat treatment will produce a foam that has a porous structure wherein the majority of the pores are interconnected to provide continuous fluid pathways. Upon sintering, this foam becomes the solid-state porous support matrix 20 with a foam-like microstructure.

Instead of or in addition to the foaming agent, combustible additives may be added to the slurry, such as polymer powder, organic powder, saw dust and fibres. Upon sintering at a temperature hot enough to combust the combustible additives, the additives burn away, leaving behind the solid-state support matrix 20 with a foam-like porous microstructure.

Instead of or in addition to the foaming agent and combustible additives, a porous foam-like microstructure can be formed by using hollow ceramic particles. Spherical ceramic particles such as commercially available alumina bubbles ($Al_2O_3$) are first coated with matrix material, e.g. by dipping or spraying the particles with the slurry, or by electroless coating of matrix material onto the particles. Then, the coated particles are placed in a container having a plurality of tubular fuel cells arranged in the desired stack configuration. The container is packed with the particles such that tubular fuel cells are held securely in place. Then, a lid is placed on the container, and the filled container is subjected to a sintering process whereby the coating will bond with the particles thereby physically interconnecting the particles.

The slurry is injected or poured through the slurry port 160 until the container is filled and the fuel cells 12 are immersed with slurry. The slurry is left to completely dry at ambient temperature (or at an elevated temperature up to about 120 degree C.).

After the slurry has dried, the container and its contents are sintered. The sintering cycle involves first increasing the temperature from ambient to 200° C. for and holding at that temperature 1–10 hours, then increasing the temperature to 500° C. and holding at that temperature for 1–10 hours, then increasing the temperature to 650° C. and holding at that temperature for 1–10 hours, then increasing the temperature to 900° C. and holding at that temperature for 1–10 hours, then finally increasing the temperature to 1000–1400° C. and holding at that temperature for 5 hours. The rate of temperature increase in each step is between 20–300° C. The temperature is then allowed to drop to ambient temperature at a rate of between 60–300° C.

During sintering, the combustible flexible sheet 56 is burned away, leaving behind a fuel cell stack 10 or sub-stack 40 having the fuel cells 12 embedded in the solidified porous support matrix 20 such that the matrix surrounds the length of each embedded fuel cell (because the ends of the fuel cells are masked prior to coating with slurry, they are free of the matrix). The end plates 54 are then removed, and the stack 10 is ready for combining with other components to produce a fuel cell system, or the sub-stack 40 is ready for combining with other sub-stacks to form the stack 10.

According to an alternative embodiment of the invention (not shown), the stack or sub-stack can be formed by first coating each fuel cell with slurry, then stacking the slurry-coated fuel cells onto a plate such that the slurry coat on each fuel cell contacts the slurry coat in adjacent fuel cells. The coating may be effected by dip-coating or spraying or other suitable known means. Combustible spacers may be placed between the fuel cells during stacking, to maintain a desired separation between fuel cells in the stack. The spacers may have different geometries depending on the desired geometrical configuration of the stack, e.g. hexagonal inserts will form a stack of fuel cells in a honeycomb-like configuration. Then, the stacked cells are allowed to dry, and sintered according to the sintering steps described above, such that a sub-stack having the fuel cells embedded in the porous matrix is formed. Upon sintering, the combustible spacers, if any, burn away. Alternatively, the spacers may be made from a non-combustible material such as metal; such spacers remain with the fuel cells after sintering, and in such case, are provided with channels therethrough to allow reactant to flow through the spacers.

According to another alternative embodiment of the invention (not shown), the stack or sub-stack can be formed by first coating each fuel cell with slurry, then stacking the slurry-coated fuel cells onto a flexible sheet of paper, plastic or other suitably flexible material such that the slurry coat on each fuel cell contacts the slurry coat in adjacent fuel cells. Again, combustible spacers may be inserted between fuel cells. The flexible sheet can then be folded, bent, or otherwise manipulated into a desired shape of the sub-stack, e.g. the sheet can bent into a cylindrical or another desired shape to form a stack or sub-stack. The fuel cells, slurry, and sheet are then dried and sintered according to the steps described above. The sheet may be made of a combustible material that burns away upon sintering.

According to yet another alternative embodiment of the invention (not shown), the stack or sub-stack can be formed by first pouring the slurry into a container, then inserting one or more combustible rods or other suitable elongate member into the slurry. The slurry and rods are then dried and sintered according to the steps described above, and the rods burn away, leaving behind a porous matrix with channels corresponding to the burned-away rods. Then, a fuel cell corresponding in shape and size to the channel is inserted into each channel. If the fuel cell is not securely embedded in the channel, additional slurry may be poured between the fuel cell and the channel, and an additional drying and sintering step can be carried out to solidify the slurry and fasten the fuel cell in place.

Any of the above methods of producing the sub-stack can optionally include a further step of inserting combustible rods, filaments, fibres, tows or other suitable elongate members into the slurry before it dries, so that channels in the matrix are formed when the slurry is dried and sintered at a temperature sufficient to solidify the slurry into the matrix, and to burn away the combustible inserts. These channels can be parallel, perpendicular, or in any other direction relative to the fuel cells.

According to yet another alternative embodiment of the invention (not shown), the stack or sub-stack can be formed using a templated processing technique. This technique involves first inserting fuel cells into a suitable template material, such as a sponge, carbon felt, or graphite felt, such that the fuel cells are securely held in place. Then, the template material is impregnated with the slurry. Then, the slurry and fuel cell containing template is dried and sintered. During sintering, the template material will burn away, leaving behind a foam-like porous matrix.

If the fuel cells are too fragile to survive inserting directly into the template material, metal or plastic tubes (having an inside diameter at least as large as the outside diameter of the fuel cell) are first inserted into the template material, then the fuel cells are inserted into the tubes. The tubes are then withdrawn from the template material, leaving behind the embedded fuel cells. Alternatively, combustible tubes or rods may be inserted into the template material. The template is then impregnated with slurry and dried and sintered. Upon sintering, the combustible tubes/rods burn away, leaving behind channels that enable the fuel cells to be inserted into template material. If the fuel cells are not securely held inside these channels, additional slurry may be added, that upon drying and sintering will secure the fuel cells in place.

The template may be a non-combustible material such as an electrically conductive metal felt. The metal felt may be impregnated with a slurry that is ionically conductive and/or catalytic, to enhance the performance of the stack. In this case, a bonding slurry can be added between the felt and the fuel cells embedded in the felt. Upon heat treating, the bonding slurry will secure the fuel cells to the metal felt and improve the electrical conductivity between the felt and the fuel cell. The bonding slurry may be composed of cathode material, or the same metal as the felt. As an alternative to or in addition to adding bonding slurry, the fuel cell embedded felt may be placed inside a thermally and electrically insulating container and compressed by the container until a suitable contact is established between the felt and the fuel cells.

According to yet another embodiment of the invention, a fuel cell stack of small diameter tubular fuel cells are formed by wrapping each single cell in metal wire; two or more cells may be mechanically interconnected by wrapping the cells with a single wire. The wire serves as a support structure for the fuel cells, as well as a current collector. If the wire is coated with catalyst material, the wire can enhance the catalytic activity of the fuel cell stack.

According to another embodiment of the invention, a fuel cell stack of small diameter tubular fuel cells are formed by wrapping each single cell in a metal mesh; two or more cells may be mechanically interconnected by wrapping the cells with a single strip of metal mesh. The mesh serves as a support structure for the fuel cells, as well as a current collector. If the mesh is coated with catalyst material, the mesh can enhance the catalytic activity of the fuel cell stack.

According to yet another embodiment of the invention, and referring to FIGS. 33–40, the inside of the fuel cell 12 may contain a porous electrically conductive foam-like inner core 162. The core 162 is electrically connected to the anode surface 14 of the fuel cell 12, and service to collect current and provide mechanical support for the fuel cell 12. The porosity of the core 162 is selected to be sufficient to allow fuel to flow through the core 162 and reach the anode surface 14 of the fuel cell 12. The core 162 may be coated with a catalyst material to promote the electrochemical reaction. As seen in FIGS. 36 to 38, a metal wire 164 may be embedded in the centre of the core 162 such that one end extends out of the fuel cell 12 and is electrically couplable to the external circuit. Such a wire 164 serves to collect current. A plurality of flow channels 166 may be formed in the core 162 to enhance the flowthrough of reactant.

Figure 39:
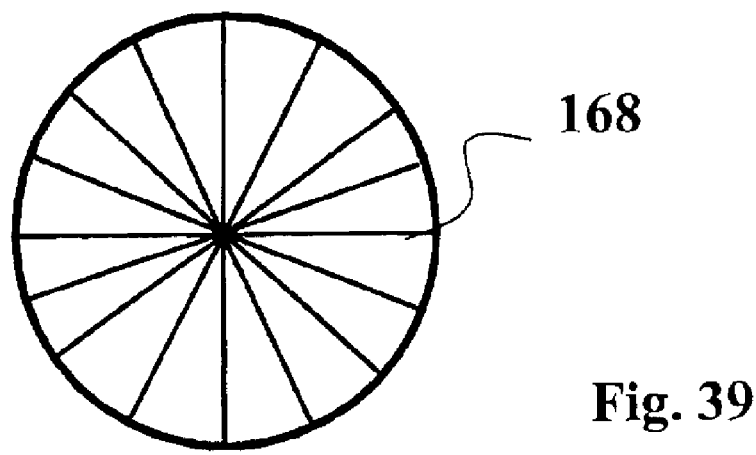
FIG. 39 is a schematic end view of an inner core having a series of longitudinally extending plates in physical and electrical contact with the electrode inner surface.

Referring to FIG. 39, instead of a foam-like inner core 162, a series of porous metal sheets 168 may be inserted inside each fuel cell 12 to provide mechanical support to the fuel cell 12 as well as to collect current.

Figure 40:
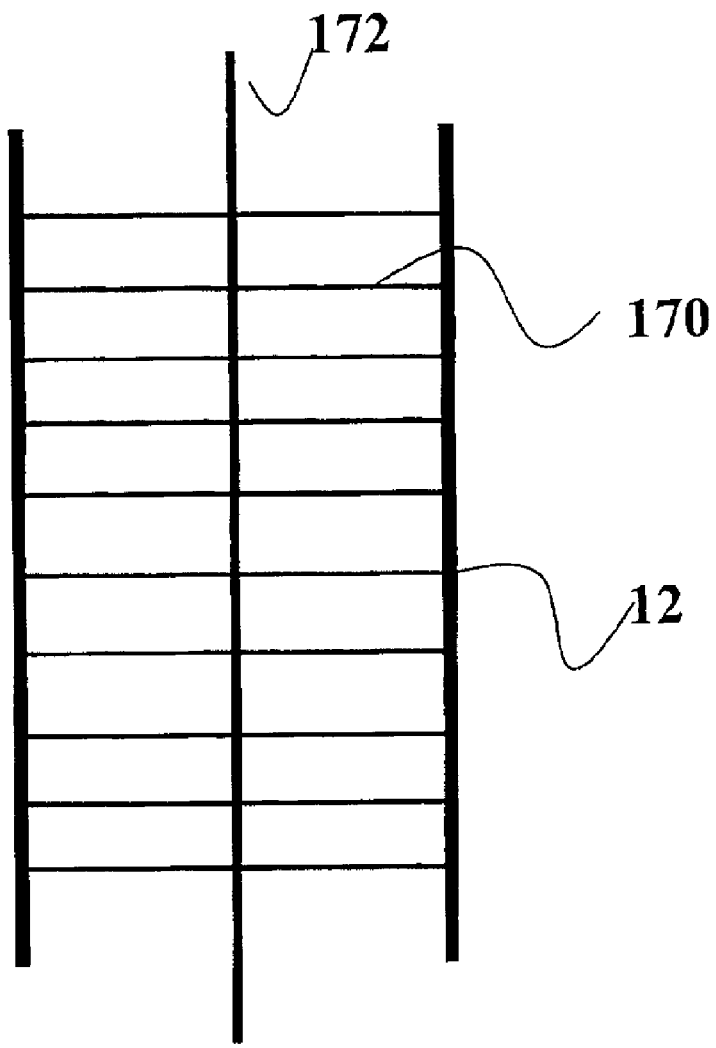
FIG. 40 is a schematic longitudinal view of an inner core having a central conductor rod and a plurality of filaments wrapped around the rod and physically and electrically contacting the electrode inner surface.

Referring to FIG. 40, instead of a foam-like inner core 162, the core is a plurality of metal filaments 170 wrapped around a longitudinally extending (parallel to fuel cell) central metallic wire 172 such that the filaments extend transversely to the central wire to contact the anode inner wall. Such a core resembles a "wire brush".

While the preferred embodiment of the invention has been illustrated and described, it will be appreciated that various changes can be made therein without departing from the scope and spirit of the invention.

We claim:

1. A fuel stack comprising:
   (a) a plurality of inner tubular solid oxide fuel cells, the inside of at least one of the inner fuel cells being capable of fluid coupling to a first reactant source;
   (b) a porous support matrix embedding the inner fuel cells and being capable of fluid coupling to a second reactant source such that a second reactant is flowable through the matrix and to the outer surface of at least one of the embedded fuel cells; and
   (c) an outer tubular solid oxide fuel cell wherein the inside of the outer fuel cell contains the matrix and the inner fuel cells such that the second reactant is flowable through the matrix and to an inside surface of the outer fuel cell and wherein the outer surface of the outer fuel cell is capable of fluid coupling to a first reactant source.

2. A fuel cell system comprising:
   (a) at least one fuel cell stack of claim 1;
   (b) external circuit electrical leads electrically coupled to the anodes and cathodes of the fuel cells and capable of electrical coupling to an external electrical circuit; and
   (c) a thermal enclosure assembly enclosing the stack and including a fuel inlet and a fuel outlet both fluidly coupled to anodes of the fuel cells, and an oxidant inlet and an oxidant outlet both fluidly coupled to cathode of the fuel cells.

3. The fuel cell system of claim 2, wherein the inner fuel cells each comprise an inner anode layer, an outer cathode layer, and an electrolyte layer sandwiched between the anode and cathode layers, the inner fuel cell layers being concentrically arranged, the first reactant being fuel and the second reactant being oxidant.

4. The fuel cell system of claim 3, wherein the outer fuel cell comprises an inner cathode layer, an outer anode layer, and an electrolyte layer sandwiched between the anode and cathode layers, the outer fuel cell layers being concentrically arranged.

5. The fuel cell system of claim 4, wherein the porous matrix is made of an electronic or mixed (electronic and ionic) conductive porous solid state material and is electrically coupled to the cathodes of at least some of the inner fuel cells and the outer fuel cell, and is fluidly coupled to the oxidant inlet and the oxidant outlet.

6. The fuel cell system of claim 5, further comprising a container between the thermal enclosure and the stack, the container being spaced from the stack by spacing means such that a fuel flow channel is defined in between an inner surface of the container and the outer surface of the outer fuel cell, the fuel flow channel being fluidly coupled to the fuel inlet and the fuel outlet.

7. The fuel cell system of claim 5, wherein the stack includes oxidant delivery channels in the support matrix that are fluidly coupled to the oxidant inlet.

8. The fuel cell system of claim 5, wherein the stack includes an oxidant diffuser that has an inlet fluidly coupled to the oxidant inlet and a plurality of outlets fluidly coupled to the support matrix.

9. The fuel cell system of claim 5, wherein at least some of the inner fuel cells further comprise a porous matrix structure lining the anode surfaces of the at least some of the fuel cells and being made of a porous electrically conductive solid state material.

10. The fuel cell system of claim 5, wherein at least some of the inner fuel cells further comprise a plurality of electrically conductive tabs electrically coupled to the anode surfaces of the at least some of the fuel cells and electrically coupled to the electrical leads.

11. The fuel cell system of claim 10, wherein the stack includes an anode current collector rod embedded in the matrix, and electrically coupled to at least some of the tabs and to the electrical leads.

12. The fuel cell system of claim 10, wherein the stack includes at least one anode current collector plate having fuel cell openings for receiving the inner fuel cells, and reactant perforations in the plate that enable the flow through of oxidant to the cathodes of at least some of the inner fuel cells, and being electrically coupled to at least some of the tabs and to at least some of the electrical leads.

13. The fuel cell system of claim 12, wherein the stack includes at least one cathode current collector plate having fuel cell openings for receiving the inner fuel cells, and reactant perforations in the plate that enable the flow through of oxidant to the cathodes of at least some of the inner fuel cells, and being electrically coupled to at least some of the cathodes of the inner fuel cells and to some of the electrical leads.

14. The fuel cell stack of claim 1, wherein the inner fuel cells each have a diameter between 10 .mu.m to 3500 .mu.m.

15. The fuel cell stack of claim 14, wherein the inner fuel cells each have a diameter between 200 .mu.m to 3000 .mu.m.

16. A fuel cell system comprising:
   (a) a fuel cell stack comprising a plurality of tubular solid oxide fuel cells and a stack support structure attached to each of the fuel cells, the fuel cells each comprising an anode, a cathode, and an electrolyte sandwiched between the anode and cathode;
   (b) a fuel reformer thermally coupled to the stack, and including a reformer chamber having a reformer fuel inlet capable of fluidly coupling to a fuel source and a reformer fuel outlet fluidly coupled to the anode of at least one fuel cell;
   (c) external circuit electrical leads capable of electrically coupling to the anode and cathode of at least one fuel cell and capable of electrically coupling to an external electrical circuit; and
   (d) a thermal enclosure assembly enclosing the stack and reformer and including a fuel inlet fluidly coupled to the reformer fuel inlet, a fuel outlet fluidly coupled to the anode of at least one fuel cell, and an oxidant inlet and an oxidant outlet fluidly coupled to the cathode of at least one fuel cell.

17. The fuel cell system of claim 16, wherein the reformer chamber is cup-shaped and the reformer contains the fuel cell stack and further includes a porous, catalyst-coated, foam-like matrix structure inside the reformer chamber.

18. The fuel cell system of claim 16, wherein the reformer chamber is cup-shaped and the reformer contains the fuel cell stack and further includes a reformer tube inside the reformer chamber and coiled around the fuel cell stack, wherein the reformer fuel inlet is an inlet of the reformer tube, and the reformer fuel outlet is an outlet of the reformer tube.

19. The fuel cell system of claim 18, wherein the reformer tube includes catalytic material dispersed along the inside of the reformer tube.

20. The fuel cell system of claim 19, wherein the reformer tube is embedded in a heat-conductive and structurally-supportive matrix material.

21. The fuel cell system of claim 16, wherein the at least one fuel cell comprises an inner anode layer, an outer cathode layer, and an electrolyte layer sandwiched between the anode and cathode layers, the layers being concentrically arranged.

22. The fuel cell system of claim 21, wherein the stack support structure is a porous, foam-like matrix embedding the fuel cells therein and having a porosity sufficient to allow the flow through of oxidant to the cathode of at least one of the fuel cells.

23. The fuel cell system of claim 21, wherein the stack support structure is a metal mesh wrapped around each of the fuel cells, the mesh having a porosity sufficient to allow the flow through of reactant to the outer electrode layer of at least one of the fuel cells.

24. The fuel cell system of claim 21, wherein the stack support structure is a metal wire wrapped around each of the fuel cells, the wire being wrapped such that space is provided for reactant to flow past the wire to the outer electrode layer of at least one of the fuel cells.

25. The fuel cell system of claim 22, wherein the matrix of the stack support structure is made of an electronic or mixed (electronic and ionic) conductive, porous solid state material and is electrically coupled to the cathodes of at least one of the fuel cells, and is fluidly coupled to the oxidant inlets and the oxidant outlets.

26. The fuel cell system of claim 25, wherein the fuel cells embedded in the support matrix of the stack support structure are inner fuel cells and the stack further comprises an outer tubular solid oxide fuel cell surrounding the matrix and the inner fuel cells.

27. The fuel cell system of claim 26, comprising a container between a reformer-tube and the stack, the container being spaced from the stack by spacing means such that a fuel flow channel is defined in between the container and the outer fuel cell, and is fluidly coupled to the fuel inlet and outlet.

28. The fuel cell system of claim 22, wherein the fuel cell stack includes oxidant delivery channels in the matrix of the stack support structure that are fluidly coupled to the oxidant inlet and matrix.

29. The fuel cell system of claim 22, wherein the fuel cell stack includes an oxidant diffuser that is fluidly coupled to the oxidant inlet and the matrix of the stack support structure.

30. The fuel cell system of claim 22, wherein at least some of the inner fuel cells further comprise a porous matrix structure lining surfaces of the anodes of at least some of the fuel cells and made of a porous, electrically conductive, solid state material.

31. The fuel cell system of claim 22, wherein at least some of the fuel cells further comprise a plurality of electrically conductive tabs electrically connected to the anode surfaces of the at least some of the fuel cells, and electrically coupled to the electrical leads.

32. The fuel cell system of claim 31, wherein the fuel cell stack includes an anode current collector rod embedded in the matrix, and electrically connected to at least some of the tabs and to the electrical leads.

33. The fuel cell system of claim 31, wherein the stack includes at least one anode current collector plate having openings for receiving the inner fuel cells, and being electrically connected to at least some of the tabs and electrically coupled to the electrical leads.

34. The fuel cell system of claim 33, wherein the stack includes at least one cathode current collector plate having openings for receiving the inner fuel cells, and being electrically connected to at least some of the cathodes of the inner fuel cells, and electrically coupled to the electrical leads.

35. The fuel cell system of claim 16, wherein the inner fuel cells each have a diameter between 10 .mu.m to 3500 .mu.m.

36. The fuel cell system of claim 35, wherein the inner fuel cells each have a diameter between 200 .mu.m to 3000 .mu.m.

37. A fuel cell stack comprising:
   at least one tubular solid oxide fuel cell, the fuel cell comprising an inner electrode layer, an outer electrode layer, an electrolyte layer sandwiched between the electrode layers, and a tab opening in the surface of the electrode outer layer and through the underlying electrolyte layer;
   an electrically conductive tab for electrically coupling to an external circuit, the tab comprising an electrically conductive material coating the portion of the inner layer in the tab opening; and
   a stack support structure attached to each of the fuel cells, wherein the stack support structure is a porous support matrix embedding the fuel cells therein, the porous matrix being made of an electronic or mixed (electronic and ionic) conductive, porous solid state material and being electrically coupled to the cathode of at least some of the fuel cells and being electrically coupled to the electrical leads.

38. A fuel cell stack comprising:

at least one tubular solid oxide fuel cell, the fuel cell comprising an inner electrode layer, an outer electrode layer, an electrolyte layer sandwiched between the electrode layers, and a tab opening in the surface of the electrode outer layer and through the underlying electrolyte layer;

an electrically conductive tab for electrically coupling to an external circuit, the tab comprising an electrically conductive material coating the portion of the inner layer in the tab opening; and a stack support structure attached to each of the fuel cells, wherein the stack support structure includes at least one anode current collector plate having openings for receiving the at least one fuel cell, and being electrically coupled to at least some of the anodes of the fuel cells and being electrically coupled to the electrical leads.

39. A fuel cell stack comprising:

at least one tubular solid oxide fuel cell, the fuel cell comprising an inner electrode layer, an outer electrode layer, an electrolyte layer sandwiched between the electrode layers, and a tab opening in the surface of the electrode outer layer and through the underlying electrolyte layer;

an electrically conductive tab for electrically coupling to an external circuit, the tab comprising an electrically conductive material coating the portion of the inner layer in the tab opening; and a stack support structure attached to each of the fuel cells, wherein the stack support structure includes at least one cathode current collector plate having openings for receiving the at least one fuel cell, and being electrically coupled to at least some of the cathodes of the fuel cells and electrically couplable to the external circuit.

40. A fuel cell system comprising:

(a) the fuel cell stack of claim 37;

(b) external circuit electrical leads electrically coupled to an anode and cathode of the fuel cells and electrically couplable to an external electrical circuit; and (c) a thermal enclosure assembly enclosing the stack and including a fuel inlet and outlet fluidly coupled to anodes of the fuel cells, and an oxidant inlet and outlet fluidly coupled to cathodes of the fuel cells.

41. The fuel cell stack of claim 37 wherein the stack support structure is a porous foam matrix embedding each of the fuel cells and having a porosity sufficient to allow the flow through of reactant to the outer electrode layer of at least one of the fuel cells.

42. A fuel cell stack comprising:

at least one tubular solid oxide fuel cell, the fuel cell comprising an inner electrode layer, an outer electrode layer, an electrolyte layer sandwiched between the electrode layers, and a tab opening in the surface of the electrode outer layer and through the underlying electrolyte layer;

an electrically conductive tab for electrically coupling to an external circuit, the tab comprising an electrically conductive material coating the portion of the inner layer in the tab opening; and a stack support structure attached to each of the fuel cells, wherein the stack support structure is a metal mesh wrapped around each of the fuel cells, the mesh having a porosity sufficient to allow the flow through of reactant to the outer electrode layer of at least one of the fuel cells.

43. A fuel cell stack comprising:

at least one tubular solid oxide fuel cell, the fuel cell comprising an inner electrode layer, an outer electrode layer, an electrolyte layer sandwiched between the electrode layers, and a tab opening in the surface of the electrode outer layer and through the underlying electrolyte layer;

an electrically conductive tab for electrically coupling to an external circuit, the tab comprising an electrically conductive material coating the portion of the inner layer in the tab opening; and a stack support structure attached to each of the fuel cells, wherein the support structure is a metal wire wrapped around each of the fuel cells, the wire being wrapped such that space is provided for reactant to flow past the wire to the outer electrode layer of at least one of the fuel cells.

44. A fuel cell stack comprising:

(a) at least one tubular solid oxide fuel cell, the fuel cell comprising: an inner electrode layer; an outer electrode layer; an electrolyte layer sandwiched between the electrode layers; and a porous, electrically conductive inner core having a porosity sufficient to allow the flow through of reactant to the inner electrode layer, the inner core being inside the fuel cell and electrically coupled to the inner electrode layer; and (b) a stack support structure attached to the at least one fuel cell.

45. The fuel cell stack of claim 44, wherein the inner core comprises a foam-like, electrically conductive matrix structure electrically and mechanically coupled to the inner electrode layer.

46. The fuel cell stack of claim 45, wherein the matrix structure is coated with a catalyst material.

47. The fuel cell stack of claim 46, wherein the at least one fuel cell further comprises a current collector rod embedded in the inner core matrix structure longitudinally to the inside of the fuel cell and having at least one end that is electrically coupled to an external circuit.

48. The fuel cell stack of claim 47, wherein the inner core further comprises at least one reactant flow channel in the matrix structure.

49. The fuel cell stack of claim 44, wherein the inner core comprises a plurality of electrically conductive sheets mechanically and electrically coupled to the inner electrode layer.

50. The fuel cell stack of claim 44, wherein the inner core comprises a current collector rod extending longitudinally through the inside of the at least one fuel cell and a plurality of electrically conductive filaments extending generally transversely from the collector rod and electrically and mechanically coupled to the inner electrode layer.

51. The fuel cell stack of claim 44, wherein the stack support structure is a porous foam-like matrix embedding the at least one fuel cell and having a porosity sufficient to allow the flow through of reactant to the outer electrode layer of the at least one fuel cell.

52. The fuel cell stack of claim 44, wherein the support structure is a metal mesh wrapped around the at least one fuel cell, the mesh having a porosity sufficient to allow the flow through of reactant to the outer electrode layer of the at least one fuel cell.

53. The fuel cell stack of claim 44, wherein the support structure is a metal wire wrapped around the at least one fuel cell, the wire being wrapped such that space is provided for reactant to flow past the wire to the outer electrode layer of the at least one fuel cell.

54. A fuel cell system comprising:
(a) a fuel cell stack comprising a plurality of tubular solid oxide fuel cells and a stack support structure attached to each of the fuel cells, the fuel cells each comprising an anode, a cathode, and an electrolyte sandwiched between the anode and cathode;
(b) a fuel reformer thermally coupled to the stack, and including a reformer tube coiled around the stack, the reformer tube having a reformer fuel inlet fluidly couplable to a fuel source and a reformer fuel outlet fluidly coupled to the anode of at least one of the fuel cells;
(c) external circuit electrical leads electrically coupled to the anode and cathode of at least one of the fuel cells and capable of electrically coupling to an external electrical circuit; and
(d) a thermal enclosure assembly enclosing the stack and reformer and include a fuel inlet fluidly coupled to the reformer fuel inlet, a fuel outlet fluidly coupled to the anode of at least one fuel cell, and an oxidant inlet and an oxidant outlet fluidly coupled to the cathode of at least one of the fuel cells.

* * * * *

UNITED STATES PATENT AND TRADEMARK OFFICE
CERTIFICATE OF CORRECTION

| | |
|---|---|
| PATENT NO. | : 6,936,367 B2 |
| APPLICATION NO. | : 10/156755 |
| DATED | : August 30, 2005 |
| INVENTOR(S) | : Partho Sarkar et al. |

It is certified that error appears in the above-identified patent and that said Letters Patent is hereby corrected as shown below:

Column 1 at line 2, Delete "Edmonton (CA)" and insert -- 250 Karl Clark Rd., Edmonton, Alberta (CA) T6N 1EN --, therefor.

Column 6 at line 62, delete "disicilicide" and insert -- disilicide --, therefor.

Column 16 at line 48, Delete "mehty" and insert -- methyl--, therefor.

Column 16 at line 48 Delete "arcylate" and insert --acrylate--, therefor.

Column 17 at line 15, Delete "120 degree C." and insert -- 120° C.--, therefor.

Column 20 at line 67, In Claim 14, delete "10 mu.m to 3500 mu.m." and insert -- 10 μm to 3500 μm. --, therefor.

Column 21, at line 2-3, In Claim 15, delete "200 mu.m to 3000 mu.m." and insert -- 200 μm to 3000 μm. --, therefor.

Column 22 at line 46-47, In Claim 35, delete "10 mu.m to 3500 mu.m." and insert -- 10 μm to 3500 μm. --, therefor.

Column 22 at line 49-50, In Claim 36, delete "200 mu.m to 3000 mu.m." and insert -- 200 μm to 3000 μm. --, therefor.

Signed and Sealed this

Sixteenth Day of January, 2007

JON W. DUDAS
*Director of the United States Patent and Trademark Office*